United States Patent
Honda et al.

(10) Patent No.: US 9,903,022 B2
(45) Date of Patent: Feb. 27, 2018

(54) PRODUCTION METHOD OF GALVANNEALED STEEL SHEET HAVING EXCELLENT FORMABILITY AND EXFOLIATION RESISTANCE AFTER ADHESION

(71) Applicant: NIPPON STEEL & SUMITOMO METAL CORPORATION, Tokyo (JP)

(72) Inventors: Kazuhiko Honda, Tokyo (JP); Noriyuki Suzuki, Tokyo (JP); Yoichi Ikematsu, Tokyo (JP)

(73) Assignee: NIPPON STEEL 7 SUMITOMO METAL CORPORATION, Tokyo (JP)

( * ) Notice: Subject to any disclaimer, the term of this patent is extended or adjusted under 35 U.S.C. 154(b) by 197 days.

(21) Appl. No.: 14/685,943

(22) Filed: Apr. 14, 2015

(65) Prior Publication Data

US 2015/0218706 A1    Aug. 6, 2015

Related U.S. Application Data

(62) Division of application No. 13/504,068, filed as application No. PCT/JP2010/061770 on Jul. 12, 2010, now Pat. No. 9,040,168.

(30) Foreign Application Priority Data

Oct. 26, 2009 (JP) ................. 2009-245872

(51) Int. Cl.
*C23C 22/08* (2006.01)
*C23C 28/00* (2006.01)
(Continued)

(52) U.S. Cl.
CPC .......... *C23C 28/321* (2013.01); *B32B 15/013* (2013.01); *C22C 18/00* (2013.01);
(Continued)

(58) Field of Classification Search
CPC .... C23C 2/04; C23C 2/06; C23C 2/26; C23C 2/28; C23C 22/18; C23C 22/73; C23C 28/00
See application file for complete search history.

(56) References Cited

U.S. PATENT DOCUMENTS 5,525,431 A    6/1996  Kanamaru et al.
5,904,786 A    5/1999  Wendel et al.

FOREIGN PATENT DOCUMENTS

CN    1066207 C    5/2001
JP    59-74231 A   4/1984
(Continued)

OTHER PUBLICATIONS

U.S. Appl. No. 13/504,068, filed Apr. 25, 2012.
Chinese Office Action and Search Report dated Dec. 27, 2013 for Patent Application No. 201080048033.3, with English translation.
International Search Report, dated Aug. 10, 2010, issued in PCT/JP2010/061770.
Non-Final Office Office Action dated Aug. 14, 2014, issued in U.S. Appl. No. 13/504,068.
(Continued)

*Primary Examiner* — Lois Zheng
(74) *Attorney, Agent, or Firm* — Birch, Stewart, Kolasch & Birch, LLP

(57) ABSTRACT

The production method of the galvannealed steel sheet includes: performing a hot dip galvanization on a steel sheet; performing an alloying and forming a galvannealed layer; performing a skin pass rolling at an elongation ratio of 0.3% or more; applying a treatment liquid on a surface of the galvannealed layer using a roll coater, and allowing the treatment liquid to react with the surface immediately after the application to form a mixed layer; in the forming the mixed layer: a first applied part is formed in the mixed layer using the protrusions of the roll coater; and a second applied part is formed in the mixed layer using the recesses of the roll coater; the second applied part having an attached amount of P of 20 mg/m² or more, a surface area of the second applied part being 20% to 80% of a surface areas of the mixed layer.

2 Claims, 3 Drawing Sheets

(51) Int. Cl.
*B32B 15/01* (2006.01)
*C22C 18/00* (2006.01)
*C22C 38/00* (2006.01)
*C22C 38/02* (2006.01)
*C22C 38/04* (2006.01)
*C22C 38/06* (2006.01)
*C22C 38/14* (2006.01)
*C23C 2/06* (2006.01)
*C23C 2/28* (2006.01)
*C23C 22/18* (2006.01)
*C22C 38/12* (2006.01)
*C23C 2/04* (2006.01)
*C23C 2/26* (2006.01)
*C23C 22/73* (2006.01)
*C23C 22/48* (2006.01)

(52) U.S. Cl.
CPC ............ *C22C 38/001* (2013.01); *C22C 38/02* (2013.01); *C22C 38/04* (2013.01); *C22C 38/06* (2013.01); *C22C 38/12* (2013.01); *C22C 38/14* (2013.01); *C23C 2/04* (2013.01); *C23C 2/06* (2013.01); *C23C 2/26* (2013.01); *C23C 2/28* (2013.01); *C23C 22/18* (2013.01); *C23C 22/73* (2013.01); *C23C 28/345* (2013.01); *Y10T 428/12799* (2015.01)

(56) References Cited

FOREIGN PATENT DOCUMENTS

| | | | |
|---|---|---|---|
| JP | 59-190332 A | 10/1984 | |
| JP | 1-184227 A | 7/1989 | |
| JP | 3-274251 A | 12/1991 | |
| JP | 4-13816 A | 1/1992 | |
| JP | 8-243482 A | 9/1996 | |
| JP | 8-296065 A | 11/1996 | |
| JP | 10-510322 A | 10/1998 | |
| JP | 2002-105657 A | 4/2002 | |
| JP | 2002-119906 A | 4/2002 | |
| JP | 2002-226976 A | 8/2002 | |
| JP | 2003-293168 A | 10/2003 | |
| JP | 2004-323890 | * 11/2004 | ............... C23C 2/06 |
| JP | 2004-323890 A | 11/2004 | |
| JP | 2007-297705 A | 11/2007 | |
| JP | 2009-079277 A | 4/2009 | |

OTHER PUBLICATIONS

Notice of Allowance dated Jan. 20, 2015, issued in U.S. Appl. No. 13/504,068.

European Communication dated Oct. 12, 2017 issued in European Paten Application No. 10826403.7.

* cited by examiner

PRODUCTION METHOD OF GALVANNEALED STEEL SHEET HAVING EXCELLENT FORMABILITY AND EXFOLIATION RESISTANCE AFTER ADHESION

This application is a Divisional of application Ser. No. 13/504,068, filed on Apr. 25, 2012, which is the National Stage Entry of PCT International Application No. PCT/JP2010/061770, filed on Jul. 12, 2010, which claims priority under 35 U.S.C. § 119(a) to Japanese Patent Application No. 2009-245872, filed in Japan on Oct. 26, 2009, all of which are hereby expressly incorporated by reference into the present application.

BACKGROUND OF THE INVENTION

Field of the Invention

The present invention relates to a production method of a galvannealed steel sheet having excellent formability and exfoliation resistance after adhesion.

Description of Related Art

A galvannealed steel sheet is excellent in characteristics such as coating adhesion, corrosion resistance after coating, weldability, and the like, and thus is widely used for automobiles, home electrical appliances, building materials, and the like. The galvannealed steel sheet is produced by performing hot dip galvanization of a steel sheet on the surface and immediately thereafter heating and maintaining the galvanized steel sheet at a temperature equal to or greater than the melting point of zinc and diffusing Fe from the steel sheet into zinc thereby forming a Zn—Fe alloy. Here, since the alloying rate varies significantly depending on the composition and structure of the steel sheet, in order to control the production process, highly advanced techniques are required. In addition, a steel sheet for an automobile which is pressed into a complex shape requires very high formability. In recent years, as the demand for corrosion resistance in automobiles has increased, cases where galvannealing are applied as steel sheets in automobiles has increased.

As the shapes of automobile bodies become complex, the demand on the formability of steel sheets has become stricter. Accordingly, better formability such as deep drawability than existing steel sheets is required of the galvannealed steel sheets.

For example, in Japanese Unexamined Patent Application, First Publication No. 59-74231 and Japanese Unexamined Patent Application, First Publication No. 59-190332, production methods are disclosed, which define compositions of a steel sheet, a hot rolling condition, and an annealing condition, producing a steel sheet having high ductility and a high r-value, and performing hot dipping on the surface of the steel sheet are disclosed. In addition, there may be a case where in order to enhance press formability and deep drawability of a galvannealed steel sheet, an oxide layer including phosphorus may be formed by treating a galvannealed surface of the steel sheet using a treatment liquid including phosphoric acid thereby providing the steel sheet with lubricity and an adhesion preventing property against a die.

SUMMARY OF INVENTION

However, according to the applications of the galvannealed steel sheet, there may be a case where an adhesive is applied to a galvannealed surface of the galvannealed steel sheet so as to be adhered to another member. Accordingly, when an oxide layer including P is formed on the galvannealed surface for the purpose of enhancing the formability of the galvannealed steel sheet, there may be a case where adhesiveness declines depending on the oxide layer formation condition.

The present invention is contrived in view of the above-described circumstances and an object of the present invention is to provide a production method of a galvannealed steel sheet having excellent formability and adhesion.

In order to accomplish the aforementioned object, each aspect of the present invention includes the following elements.

(1) An aspect of the present invention is a production method of a galvannealed steel sheet, the method including: performing a hot dip galvanization on a steel sheet; performing an alloying and forming a galvannealed layer including an amount equal to or more that 0.5% and equal to or less than 0.5% of Al and an amount equal to or more than 6% and equal to or less than 12% of Fe; performing a skin pass rolling at an elongation ratio of equal to or more than 0.3%; and applying a treatment liquid on a surface of the galvannealed layer using a roll coater having protrusions and recesses on a surface, and allowing the treatment liquid to react with the surface immediately after the application to form a mixed layer including a composite oxide of Mn, Zn, and P and an aqueous P compound, wherein in the forming the a mixed layer: a first applied part is formed in the mixed layer using the protrusions of the roll coater; and a second applied part is formed in the mixed layer using the recesses of the roll coater, the second applied part having an attached amount of P equal to or more than 20 mg/m$^2$, a surface area of the second applied part being equal to or higher than 20% and equal to or lower than 80% of a surface area of the mixed layer.

(2) In the production method of a galvannealed steel sheet described in (1), the total size of the second applied part may be adjusted by adjusting a shape of the protrusions and recesses of the roll coater and a nip pressure of the roll coater.

According to the aspects of the present invention, it is possible to provide a production method of the galvannealed steel sheet having both excellent formability and excellent exfoliation resistance after adhesion.

DESCRIPTION OF EMBODIMENTS

Figure 1A:
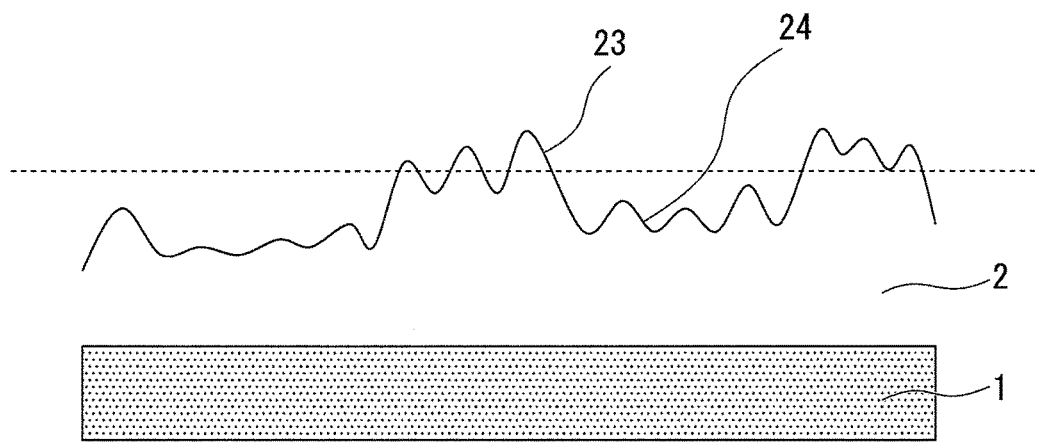
FIG. 1A is a schematic diagram showing an example of a galvannealed steel sheet before a flat portion is formed.

The inventors examined various methods for enhancing formability without declining the adhesion strength of a galvanized steel sheet. As a result, the inventors found that the formability can be significantly enhanced without a reduction in adhesion strength by, when a composite oxide layer of Mn, Zn, and P is formed on a galvanized surface, limiting the size of an area having a relatively large attached amount of P to a predetermined ratio to the entire area of the composite oxide layer.

Hereinafter, a galvannealed steel sheet according to an embodiment of the present invention will be described in detail.

The galvannealed steel sheet includes: a steel sheet; and a galvannealed layer formed on at least one surface of the steel sheet. The galvannealed layer contains an amount equal to or more than 0.05 mass % and equal to or less than 0.5 mass % of Al, an amount equal to or more than 6 mass % and equal to or less than 12 mass % of Fe, and the balance composed of Zn and inevitable impurities. The galvannealed steel sheet further includes a mixed layer which is formed on a surface of the galvannealed layer and includes a composite oxide of Mn, Zn, and P and an aqueous P compound. The composite oxide contains an amount equal to or more than 0.1 mg/m$^2$ and equal to or less than 100 mg/m$^2$ of Mn, an amount equal to or more than 1 mg/m$^2$ and equal to or less than 100 mg/m$^2$ of P, and Zn. A P/Mn ratio of the composite oxide is equal to or higher than 0.3 and equal to or lower than 50. The total size of an area of the mixed layer in which an attached amount of P is equal to or more than 20 mg/m$^2$ is equal to or higher than 20% and equal to or lower than 80% of the surface area of the mixed layer.

In this embodiment, an Al composition of the galvannealed layer 2 is limited to 0.05 to 0.5%. When the Al composition is less than 0.05%, during an alloying, Zn—Fe alloying proceeds too far, and a brittle alloy layer is overdeveloped at the interface between the steel substrate (steel sheet 1) and the galvannealed layer (galvannealed layer 2). Accordingly, the plating adhesion deteriorates. On the other hand, when the Al composition is higher than 0.5%, a very thick Fe—Al—Zn based barrier layer is formed such that alloying does not proceed during the alloying treatment. Accordingly, the galvannealed layer cannot achieve a target content of iron. The Al composition is preferably 0.1 to 0.4% and more preferably 0.15 to 0.35%.

An Fe composition of the galvannealed layer 2 is limited to 6 to 12%. When the Fe composition is lower than 6%, Zn—Fe alloying does not sufficiently proceed on the galvannealed surface and press formability is considerably reduced. When the Fe composition is higher than 12%, a brittle alloy layer is overdeveloped at an interface between the galvannealed layer and the steel sheet and thus the plating adhesion deteriorates. For the aforementioned purpose, the Fe composition is preferably 8 to 12% and the Fe composition is more preferably 9 to 11.5%.

In this embodiment, in the galvannealed layer 2, different alloy phases called η phase, ζ phase, δ phase, Γ phase, and $\Gamma_1$ phase exist depending on the Fe content during alloying. Here, the η phase is soft and thus adheres to a die during the press-forming, and results in a exfoliation called flaking. Flaking is a phenomenon in which the soft phase having a high coefficient of friction, and thereby having a bad sliding properties, adheres to a die and cause a exfoliation of the galvannealed layer. On the other hand, the Γ phase and the $\Gamma_1$ phase are hard and brittle and therefore tend to cause an exfoliation thereof called powdering during processing. This powdering is a phenomenon in which the hard and brittle phase becomes a powder and detaches during processing. Therefore, the η phase, the Γ phase, and the $\Gamma_1$ phase are reduced as much as possible, and one or both of the ζ phase and the $\delta_1$ phase are contained as main components in the galvannealed layer, thereby obtaining a galvannealed layer having excellent formability and adhesion.

In this embodiment, the η phase is a hexagonal Zn phase having lattice constants of a=2.66 Å and c=4.94 Å. In this embodiment, 'ζ phase' refers to a monoclinic intermetallic compound having lattice constants of a=13.4 Å, b=7.6 Å, c=5.06 Å, and β=127.3°. The intermetallic compound of the ζ phase is considered to be $FeZn_{13}$. In this embodiment, the $\delta_1$ phase refers to a hexagonal intermetallic compound having lattice constants of a=12.8 Å and c=57.4 Å. The intermetallic compound of the $\delta_1$ phase is considered to be $FeZn_7$. In this embodiment, the $\Gamma_1$ phase refers to a face-centered cubic intermetallic compound having a lattice constant of a=17.96 Å. The intermetallic compound of the $\Gamma_1$ phase is considered to be $Fe_5Zn_{21}$ or $FeZn_4$. In this embodiment, the Γ phase refers to a body-centered cubic intermetallic compound having a lattice constant of a=8.97 Å. The intermetallic compound of the Γ phase is considered to have the composition of $Fe_3Zn_{10}$.

In this embodiment, hot dip galvanization is performed on the steel sheet 1 and then is heated and subjected to alloying to diffuse Fe into the galvannealed layer, thereby producing a galvannealed steel sheet 10. Due to the diffusion of Fe, Fe—Zn intermetallic compounds are generated and develop, in the order of the ζ phase, the $\delta_1$ phase, the $\Gamma_1$ phase, and the Γ phase, and, the η phase disappears. When alloying is continued after the η phase disappears, Fe is further diffused, the ζ phase disappears, and the $\delta_1$ phase, the $\Gamma_1$ phase, and the Γ phase develop.

However, when the Γ phase is thickened, powdering tends to occur during processing. Therefore, it is preferable that the alloying be performed so that the η phase disappears and the Γ phase is not developed.

Specifically, as described below, it is preferable to control the ratio (amount of each alloy phase) of the X-ray crystal intensity of each alloy phase to the X-ray diffraction intensity (ISi) of d=3.13 Å of an Si standard sheet. That is, Iη/ISi, Iζ/ISi, and IΓ/ISi are considered, which are ratios of X-ray diffraction intensities Iη, Iζ, and IΓ of d=1.237 Å, d=1.26 Å, and D=1.222 Å representing the η phase, the ζ phase, and the Γ phase to the ISi. It is preferable that the ratios satisfy 0≤Iη/ISi≤0.0006, 0≤IΓ/ISi≤0.004, and Iζ/ISi≥0.0005. Since it is difficult to distinguish between the Γ phase and the $\Gamma_1$ phase in the X-ray diffraction, the $\Gamma_1$ phase and the Γ phase are combined and the combination is treated as the Γ phase.

When Iη/ISi is equal to or lower than 0.0006, an extremely small amount of the η phase exists, so that a reduction of plating adhesion due to flaking is not observed. Accordingly, this condition is preferable, and it is more preferable that Iη/ISi be equal to or lower than 0.0004.

In addition, in a case where IΓ/ISi is equal to or lower than 0.004, the Γ phase is thin enough, so that a reduction of plating adhesion due to powdering is not observed. Accordingly, this condition is preferable, and it is more preferable where IΓ/ISi is equal to or lower than 0.002.

Particularly, for steel sheets having a high alloying rate such as ultra low carbon IF steel, it is preferable to subject the steel sheet to an appropriate degree of alloying so that the η phase disappears while the ζ phase remains, in order to achieve an IΓ/ISi equal to or lower than 0.004. When the Iζ/ISi is equal to or higher than 0.0005, the degree of alloying process is appropriate, resulting in an appropriate thickness of the Γ phase. Therefore, a reduction of plating adhesion due to powdering does not occur. Accordingly, the Iζ/ISi is preferably equal to or higher than 0.0005 and more preferably equal to or higher than 0.001.

In this embodiment, the state of the Si phase is not particularly limited. However, the $\delta_1$ phase exhibits better performance than other alloy phases to suppress flaking and powdering. Therefore, when there is a high requirement for suppression of flaking and powdering, a greater amount of $\delta_1$ phase is preferable. Specifically, it is preferable that the ratio $I\delta_1/ISi$, which is the ratio of the X-ray diffraction intensity $I\delta_1$ of d=1.279 representing $\delta_1$ phase, to an X-ray diffraction intensity ISi of d=3.13 of the Si standard sheet, satisfies $I\delta_1/ISi \leq 0.001$.

In addition, in this embodiment, the effect of the present invention is not affected when an amount equal to or less than 2 mass % of at least one kind of Pb, Sb, Si, Fe, Sn, Mg, Mn, Ni, Cr, Co, Ca, Cu, Li, Ti, Be, Bi, and rare earth elements is contained or contaminated into the galvannealed layer. The above-mentioned elements may be helpful for the improvement of corrosion resistance or the like depending on the amount. The amount of the attached galvannealed layer is not particularly limited. When a higher corrosion resistance is required, the amount of the attached galvannealed layer is preferably equal to or higher than 20 g/m$^2$, and more preferably equal to or higher than 25 g/m$^2$. In addition, when a higher economical efficiency is required, the amount of the attached galvannealed layer is preferably equal to or lower than 150 g/m$^2$, and more preferably equal to or lower than 100 g/m$^2$.

Moreover, in this embodiment, in order to enhance formability of the galvannealed steel sheet, a composite oxide layer 5 (composite oxide film) is formed on the surface of the galvannealed layer 2. Here, an appropriate reaction condition is employed so that an aqueous P compound in addition to the composite oxide is included in the composite oxide layer 5. Accordingly, the composite oxide layer 5 becomes a mixed layer including both the composite oxide and the aqueous P compound.

The composite oxide layer 5 contains 0.1 to 100 m g/m$^2$ of Mn, 1 to 100 mg/m$^2$ of P, and Z. The P/Mn ratio of the composite oxide layer 5 is 0.3 to 50. The composite oxide layer 5, as described above, may be formed by controlling the film composition to cause the galvannealed layer 2 having a low Fe content to directly react with Mn. Therefore, the composite oxide layer 5 contains an amorphous compound. This amorphous compound suppresses the adhesion of the galvannealed layer formed on the surface of the galvannealed steel sheet, thereby enhancing the lubricity. Moreover, unlike oxides having a strong crystal structure (crystalline), the amorphous compound has flexibility and thus easily follows deformation. Accordingly, even with a thin composite oxide layer, a new surface is less likely to be formed during processing.

When the Mn content is less than 0.1 mg/m$^2$, adhesion of the galvannealed layer to a die cannot be sufficiently suppressed, resulting in a low formability. When the Mn content is more than 100 mg/m$^2$, the effect of suppressing the adhesion of the galvannealed layer is saturated. Accordingly, the Mn content in the composite oxide layer 5 of the Mn, Zn, and P is limited to 0.1 to 100 mg/m$^2$. In addition, when the P content is less than 1 mg/m$^2$, a lubricating effect from the composite oxide layer 5 is not sufficient, resulting in a low formability. When the P content is more than 100 mg/m$^2$, the lubricating effect from the composite oxide layer 5 is saturated. Accordingly, the P content of the composite oxide layer 5 of Mn, Zn, and P is limited to 1 to 100 mg/m$^2$. When a particularly high formability is required, it is preferable that the Mn content be 0.5 to 100 mg/m$^2$ and the P content be 2 to 100 mg/m$^2$, and it is more preferable that the Mn content be 2 to 70 mg/m$^2$ and the P content be 10 to 70 mg/m$^2$.

In addition, when the P/Mn ratio (mass ratio) is higher than 50, adhesion strength of the composite oxide layer 5 becomes low. When the P/Mn ratio is lower than 0.3, a desired composite oxide layer cannot be obtained. Accordingly, the P/Mn ratio is limited to 0.3 to 50. In particular, when an adhesive with lower adhesion strength is being used, the P/Mn ratio of the composite oxide layer 5 is preferably 0.3 to 30 and more preferably 0.5 to 20. The reaction area enhances adhesion between the galvannealed layer 2 and the composite oxide layer 5 and enhances lubricity as it exists on the surface of the composite oxide layer 5.

A Zn content of the composite oxide layer 5 of Mn, Zn, and P does not have a significant effect on the formability of the galvannealed steel sheet 10 and thus is not particularly limited. In order to suppress the production costs of the galvannealed steel sheet 10, it is preferable that the Zn content is 0.1 to 300 mg/m$^2$ and the Zn/Mn ratio is equal to or lower than 20.

It is preferable that a thickness of the composite oxide layer 5 is equal to or greater than 0.1 nm and smaller than 100 nm. When the thickness of the composite oxide layer 5 is equal to or greater than 0.1 nm, a sufficient adhesion suppressing effect and lubricating effect can be obtained, thereby enhancing formability. When the thickness of the composite oxide layer 5 is smaller than 100 nm, a compound area (reaction area) in which the galvannealed layer 2 and Mn directly react with each other is caused to reliably remain on the surface of the composite oxide layer 5. Accordingly, without saturating the effect of enhancing formability, costs can be adequately reduced. When higher formability is needed, it is preferable that the thickness of the composite oxide layer 5 be equal to or greater than 1 nm. In addition, when cost savings are more important, it is more preferable that the thickness of the composite oxide layer 5 be equal to or smaller than 50 nm.

Moreover, in order for the compound area (reaction area) on the surface of the composite oxide layer 5, in which the galvannealed layer 2 and Mn directly react with each other, to exhibit the maximum lubricating effect, it is most preferable that the thickness of the composite oxide be smaller than 10 nm. Particularly, the required thickness for the composite oxide is influenced by an area ratio and a surface roughness of a flat portion 3 of the galvanized layer described later. Particularly, when the roughness of the flat portion 3 is smaller than 0.5 μm, most of the reaction area of the composite oxide of equal to or greater than 0.1 nm and smaller than 10 nm may directly come in contact with the die. Accordingly, even with insufficient lubricating oil, a sufficient lubricating effect can be obtained by the composite oxide.

In addition, as described later, in order to enhance the formability while suppressing the reduction of adhesiveness, it is preferable that the aqueous P compound be contained in the composite oxide layer 5.

The composite oxide of Mn, Zn, and P in the composite oxide layer 5 may be an amorphous compound generated by reacting Mn or ions of an oxide thereof, Zn or ions of an oxide thereof; and a compound composed of an oxide of P with each other. It is preferable that at least one kind of phosphoric acid group, phosphorous acid group, and hypophosphorous acid group be included in the amorphous compound (composite oxide layer 5). In this case, high formability can be obtained even with a thin film. When the outermost surface of the composite oxide layer 5 includes a compound generated by reacting Mn with at least one kind of the phosphoric acid, phosphorous acid group, and hypophosphorous acid, a higher formability can be obtained. When a film is formed on the galvanized layer, Zn is also reacted with Mn and the at least one kind of the phosphoric acid, phosphorous acid group, and hypophosphorous acid, thereby reducing production costs. The compound generated by reacting Mn with P and Zn has very high lubricity, so that it is preferable that the compound be included in the surface of the composite oxide layer 5.

In addition, in a case where one or more kinds of elements including Li, Be, C, F, Na, Mg, Si, Cl, K, Ca, Ni, Mo, V, W, Ti, Fe, Rb, Sr, Y, Nb, Cs, Ba, and lanthanoids are incorporated to a certain degree (equal to or less than about 10% in the film) in the form of ions, oxide, hydroxide, phosphate, phosphite, hypophosphite, sulfate, nitrate, or the like, the elements do not have an adverse effect on lubricity, chemical conversion treatability, adhesive compatibility (adhesion), and the like of the galvannealed steel sheet 10. In addition, a small amount (equal to or less than about 1% in total in the film) of Cr, Cd, Pb, Sn, and As has almost no adverse effect such as a reduction of chemical conversion treatability and contamination of a chemical conversion treatment liquid. Therefore, a small amount of the above-mentioned elements may be included in the composite oxide layer 5.

In the galvannealed steel sheet 10 in this embodiment, the composite oxide of Mn, Zn, and P (composite oxide layer 5) formed on the galvannealed layer includes the aqueous P compound. Accordingly, the composite oxide layer 5 becomes a mixed layer of the P composite oxide and the aqueous P compound. Due to the effect of this mixed layer, inflow resistance at a part under high surface pressure is reduced, and thus the formability is enhanced. Accordingly, in the galvannealed steel sheet 10, as an amount of the attached mixed layer is increased, the formability enhancement effect is increased. On the other hand, an increase in the amount of the attached mixed layer results in a reduction in adhesion. Therefore, in order to exhibit both high formability and adhesion, the total size of the area in which the attached amount of P is equal to or greater than 20 mg/m$^2$ is limited to a range of 20 to 80% with respect to the area occupied by the mixed layer.

When the total size of the area in which the attached amount of P is equal to or greater than 20 mg/m$^2$ and is equal to or higher than 20% of the area occupied by the mixed layer, there is an effect of sufficiently enhancing formability. In addition, when the total size of the area in which the attached amount of P is equal to or greater than 20 mg/m$^2$ is equal to or lower than 80% of the area occupied by the mixed layer, a sufficient adhesion strength can be obtained for many general adhesives. When an adhesive with particularly low adhesiveness is used, the area ratio may be limited to 20 to 60%, and is more preferably limited to 30 to 60%. A method of adjusting the area ratio will be described later.

In addition, since P is highly effective in enhancing lubricity, the formability enhancement effect is further increased by increasing the P/Mn ratio. On the other hand, adhesion is enhanced as the P/Mn ratio is reduced. Accordingly, in order to exhibit both high formability and adhesion, the total size of the area in which the P/Mn ratio is equal to or higher than 3 is preferably in the range of 1 to 50% of the area of the mixed layer, is more preferably in the range of 2 to 40%, and most preferably in the range of 5 to 30%.

The reason the total size of the area in which the P/Mn ratio is equal to or higher than 3 is limited to be equal to or higher than 1% of the area occupied by the mixed layer is that the effect of enhancing formability is not sufficient when the total size of the area in which the P/Mn ratio is equal to or higher than 3 is lower than 1% thereof. In addition, the reason the total size of the area in which the P/Mn ratio is equal to or higher than 3 is limited to be equal to or lower than 50% of the area occupied by the mixed layer is that the adhesion strength is insufficient when the total size of the area in which the P/Mn ratio is equal to or higher than 3 is higher than 50%.

In addition, when a predetermined amount of P exists in the composite oxide layer 5 as an unreacted aqueous P compound instead of becoming the composite oxide of Mn, Zn, and P, the effect of further enhancing formability can be obtained by the actions described below, and therefore it is possible to exhibit both high formability and adhesion. When the unreacted aqueous P compound exists, during the press-forming, the mixed layer in which the attached amount of P is high and the P/Mn ratio is high contributes to the enhancement of formability. That is, both the composite oxide and the aqueous P compound additively contribute to the enhancement of formability. Thereafter, during adhering, the unreacted aqueous P compound is absorbed by an adhesive along with rust resistant oil and removed from the composite oxide layer 5. In this stage, in the composite oxide layer 5, only the composite oxide layer of Mn, Zn, and P remains, in which the attached amount of P and the P/Mn ratio are relatively low. Accordingly, it is possible to suppress a reduction in the adhesion strength.

The ratio of the remaining aqueous P compound is preferably 1 to 50 mass % of the total weight of the mixed layer of the composite oxide of Mn, Zn, and P and the aqueous P compound. When the ratio of the aqueous P compound is less than 1 mass %, the effect of enhancing formability is insufficient. When the ratio thereof is more than 50 mass %, the effect of suppressing the reduction in adhesion is not sufficient. When particularly high formability and adhesion are both needed, the ratio of the aqueous P compound is preferably 10 to 45 mass %, and more preferably, 15 to 40 mass %.

Figure 1B:
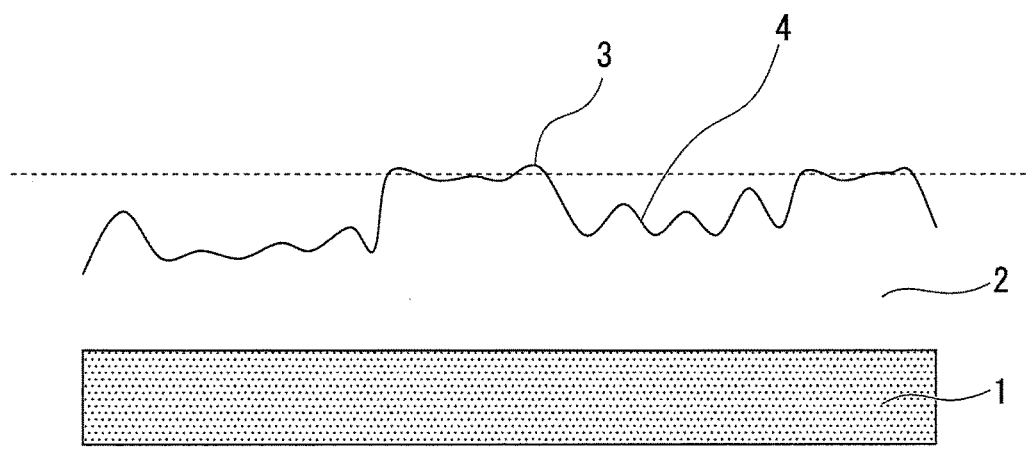
FIG. 1B is a schematic diagram showing an example of the galvannealed steel sheet after the flat portion is formed.
Figure 1C:
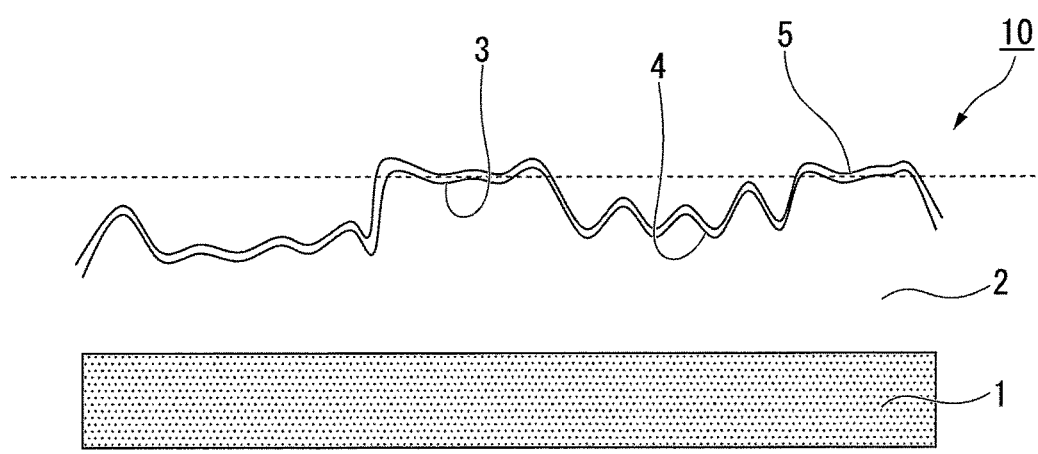
FIG. 1C is a schematic diagram showing an example of the galvannealed steel sheet according to an embodiment of the present invention.

In this embodiment, the composite oxide layer 5 of Mn, Zn, and P suppresses adhesion of the galvannealed layer to the die and imparts lubricity, thereby enhancing the formability of the galvannealed steel sheet 10. Here, when the galvannealed layer is significantly deformed in press-forming to form a new surface and the new surface comes in contact with the die, the formability enhancement effect of the composite oxide layer 5 cannot be exhibited. As illustrated in FIG. 1A, since unevenness (a rough surface) occurs in the galvannealed layer 2 during an alloying reaction, when the galvannealed layer 2 comes in contact with the die at a high surface pressure, stress is concentrated on a protruded portion 23 in press-forming and the galvannealed layer is significantly deformed. Accordingly, it is difficult to sufficiently exhibit the formability enhancement effect of the composite oxide layer 5 in press-forming at high surface pressure. Therefore, according to the embodiment, as illustrated in FIG. 1B, the protruded portion is deformed to become the flat portion 3 in advance (for example, by subjected to a skin pass rolling corresponding to the dashed line in FIG. 1A) such that the composite oxide layer 5 of Mn, Zn, and P is formed on the deformed galvannealed layer 2.

Specifically, the surface of the galvannealed layer 2 has the flat portion 3 and the rough portion 4 (recessed portion) formed at a position (relatively low position) closer to the steel sheet 1 than the flat portion 3. The area ratio occupied by the flat portion 3 is 10 to 70%, and the composite oxide layer 5 of Mn, Zn, and P is formed on the flat portion 3. In press-forming, the flat portion 3 comes in contact with the die and is applied with surface pressure from the die. Accordingly, when the area ratio of the flat portion 3 is equal to or higher than 10%, the surface pressure from the die can be reduced, and simultaneously, the formability enhancement effect of the composite oxide can be sufficiently exhibited. When the area ratio of the flat portion 3 is lower than 10%, the surface pressure applied to the flat portion 3 from the die is too great, the galvannealed layer is deformed and thus the formability thereof declines. Therefore, the area ratio of the flat portion 3 of the galvannealed layer 2 is equal to or higher than 10%.

As the area of the flat portion 3 is increased, the formability enhancement effect of the galvannealed steel sheet 10 can be obtained at a higher surface pressure (stronger processing force). Accordingly, a higher area ratio of the flat portion 3 is more preferable. However, in order to obtain the flat portion 3 having an area ratio of higher than 70%, the galvannealed steel sheet has to be subjected to quite significant deformation, and at the same time the quality of the steel sheet itself is deteriorated. Therefore, in consideration of comprehensive performance of the galvannealed steel sheet 10, the area ratio of the flat portion is equal to or lower than 70%. Particularly, when press-forming is performed at a high deformation degree with the die having high surface pressure, in order to suppress the formation of a new surface, the area ratio of the flat portion 3 is preferably equal to or higher than 20% and more preferably equal to or higher than 30%. In addition, in order to reliably ensure properties of the base material (base steel sheet 1) of the galvannealed steel sheet 10, the area ratio of the flat portion 3 is preferably equal to or lower than 50% and more preferably equal to or lower than 40%.

In addition, in the embodiment, it is preferable that the surface roughness Ra of the flat portion 3 be lower than 0.5 µm. When the surface roughness is lower than 0.5 µm, an area in which the above-mentioned reaction area and the die are in contact with each other can be enlarged, thereby suppressing the deformation of the galvannealed layer of the flat portion 3 in press-forming. Accordingly, the problem from the contact between the newly-formed surface and the die does not occur, and thus sufficient formability enhancement effect of the composite oxide can be obtained. In addition, in order to further enlarge the contact area of the above-mentioned reaction area and the die, a lower surface roughness of the flat portion 3 is more preferable. Particularly, when a press-forming is performed at a high deformation degree with the die having a high surface pressure, in order to further enlarge the contact area of the above-mentioned reaction area and the die, the surface roughness of the flat portion 3 is preferably lower than 0.3 µm, and most preferably lower than 0.1 µm. However, the surface roughness that can be easily controlled industrially is equal to or higher than 0.01 µm. Accordingly, the lower limit of the surface roughness is preferably 0.01 µm, and more preferably 0.05 µm. As the surface roughness of the flat portion 3 is reduced, most of the reaction area of the composite oxide directly comes in contact with the die. Therefore, as long as the surface roughness Ra of the flat portion 3 is controlled to be lower than 0.5 µm, a sufficient lubricating effect can be obtained from the composite oxide layer at even a small thickness.

In addition, in the embodiment, the rough portion 4 (recessed portion) which is formed at a relatively lower position than the flat portion 3 is a portion of the galvannealed layer having a relatively smaller thickness than the flat portion 3 as observed in the direction perpendicular to the thickness direction of the steel sheet. The surface roughness Ra of the rough portion 4 is preferably equal to or higher than 0.5 µm and equal to or lower than 10 µm, and more preferably, equal to or higher than 1 µm and equal to or lower than 5 µm. The surface roughness of the rough portion 4 is determined by the alloying condition of the galvanized layer. Under an alloying condition in which the surface roughness of the rough portion 4 is higher than 10 µm, a brittle alloy layer is developed on the interface between the galvanized layer and the steel sheet 1, resulting in a declined plating adhesion. Accordingly, the surface roughness of the rough portion 4 is preferably equal to or lower than 10 µm, and more preferably, equal to or lower than 5 µm. In addition, under an alloying condition in which the surface roughness of the rough portion 4 is equal to or higher than 0.5 µm, Zn—Fe alloying is sufficiently performed on the surface of the galvanized layer and thus sufficient press formability can be ensured. Accordingly, the surface roughness of the rough portion 4 is preferably equal to or higher than 0.5 µm, and more preferably, equal to or higher than 1 µm.

As the base steel sheet, any of a hot-rolled steel sheet and a cold-rolled steel sheet may be used. Regardless of the type of the base steel sheet, the flat portion 3 that ensures an area ratio of equal to or higher than 10% and equal to or lower than 70% is formed on the surface of the galvannealed layer, and the composite oxide layer 5 of Mn, Zn, and P is formed on the flat portion 3, so that it is possible to enhance the formability thereof. Specifically, the relationship between Lankford value r (r-value) of the steel sheet and limiting drawing ratio R obtained by a TZP test may satisfy Formula (1) as follows:

$$R \geq 0.3 \times r + 1.74 \quad (1)$$

When the composite oxide layer 5 of Mn, Zn, and P is formed on the surface of the galvannealed layer 2, the deep drawability of the galvannealed steel sheet 10 is enhanced. It is considered that this is because inflow resistance of the sheet material to the vertical wall portion of the die from a blank holding portion is reduced by the effect of the composite oxide layer 5 of Mn, Zn, and P (enhancement of lubricity). In this case, when the area ratio of the flat portion 3 is small, surface pressure applied to the flat portion 3 from the die becomes too high. Accordingly, when the galvannealed layer is deformed and a surface newly formed due to the deformation comes in contact with the die, the effect of the composite oxide layer 5 of Mn, Zn, and P (enhancement of the lubricity) cannot be exhibited. Therefore, it is considered that deep drawability under high surface pressure is significantly enhanced by forming the composite oxide layer 5 of Mn, Zn, and P on the surface of the galvannealed layer 2 in which the area ratio of the flat portion 3 is 10 to 70%.

The formability enhancement effect of the present embodiment is increased as the deep drawability of the base steel sheet is enhanced, by an synergy effect. Accordingly, a higher r-value of the base steel sheet is preferable. Therefore, it is preferable that for a component having a complex shape that requires high formability, it is preferable that the C content of the base steel sheet be reduced to an extremely low level to increase the r-value of the base steel sheet.

Particularly, it is preferable to use an ultra low carbon steel sheet containing an amount equal to or more than 0.0001% and equal to or less than 0.004% of C, an amount equal to or more than 0.001% and equal to or less than 0.15% of Si, an amount equal to or more than 0.01% and equal to or less than 1.0% of Mn, an amount equal to or more than 0.001% and equal to or less than 0.1% of P, an amount equal to or less than 0.015% of S, an amount equal to or more than 0.001% and equal to or less than 0.1% of Al, an amount equal to or more than 0.002% and equal to or less than 0.10% of Ti, an amount equal to or more than 0.0005% and equal to or less than 0.004% of N, and the balance composed of Fe and inevitable impurities.

The reason the preferable range of each composition in the ultra low carbon steel sheet according to the embodiment is limited is as follows.

C is an element that increases the strength of steel, and containing an amount equal to or more than 0.0001% of C is preferable and containing an amount equal to or more than 0.0005% of C is more preferable. However, with an increase in the C content, strength is increased and formability declines. Accordingly, in order to exhibit both sufficient strength and sufficient formability, it is preferable that the upper limit of the C content be 0.004%. When a particularly high formability is needed, it is more preferable that the C content be equal to or lower than 0.003%. When a particularly complex press-forming is needed, it is most preferable that the C content be equal to or lower than 0.002%.

Si is also an element that increases the strength of steel, and an amount equal to or more than 0.001% of Si is contained. However, with an increase in the Si content, the formability and the hot dip galvanizing property of the base steel sheet is declined. Accordingly, in order to ensure sufficient strength, formability, and a hot dip galvanizing property, it is preferable that the upper limit of the Si content be 0.15%. When a particularly high formability is needed, the Si content is more preferably equal to or less than 0.10%, and most preferably equal to or less than 0.05%.

Mn is an element also for increasing the strength of steel and thus degrades formability. In order to ensure sufficient formability, the upper limit of the Mn content is preferably 1.0%, and more preferably 0.5%. With a reduction in Mn, formability of the steel sheet is enhanced. However, in order to allow the Mn content to be less than 0.01%, a large refining costs are needed. Accordingly, the lower limit of the Mn content is preferably 0.01%, and more preferably 0.03%.

P is also an element that increases the strength of steel and thus declines formability. In order to ensure a sufficient formability, the upper limit of the P content is preferably 0.1%. With a reduction in P, formability of the steel sheet is enhanced. Therefore, when a particularly high formability is required, it is more preferable that the P content be equal to or less than 0.010%. However, in order to limit the P content to be less than 0.001%, very high refining costs are needed. Accordingly, the lower limit of the P content is preferably 0.001%. In consideration of the balance between strength, formability, and costs, the P content is more preferably 0.003 to 0.010%.

S is an element that degrades the hot workability and corrosion resistance of steel. Accordingly, a smaller S content is preferable. Therefore, it is preferable that the upper limit of the S content be 0.015%. In addition, it is more preferable that the S content be equal to or less than 0.010%. Here, in order to reduce the S content in ultra low carbon steel, high refining costs are needed. In addition, in view of formability and plating adhesion, it is not necessary to excessively reduce S. Accordingly, S may be reduced to a level needed for steel sheet properties such as hot workability and corrosion resistance. Since it is difficult to completely remove S, the range of possible S content does not include 0.

Al is a deoxidizing element of steel and needs to be contained at a predetermined amount or higher. In order to sufficiently perform deoxidizing of steel, the Al content is preferably equal to or more than 0.001%, and more preferably, equal to or more than 0.005%. However, when an excessive amount of Al is contained, a coarse non-metallic inclusion is generated and thus formability may be declined. In order to prevent the generation of a coarse non-metallic inclusion, it is preferable that the upper limit of the Al content be 0.1%. In addition, in view of good steel sheet quality, it is more preferable that the Al content be equal to or less than 0.070%.

In order to fix C and N in steel as carbide and nitride, it is preferable that an amount equal to or more than 0.002% of Ti be added. Since Ti is an element that increases the r-value of the steel sheet, a larger addition amount of Ti is preferable. In order to sufficiently increase the r-value of the steel sheet, it is more preferable that an amount equal to or more than 0.010% of Ti be contained. On the other hand, when more than 0.10% of Ti is added, the effect of increasing the r-value of the steel sheet is reduced. Accordingly, in order to suppress costs needed to add alloys, it is preferable that the upper limit of a Ti content be 0.10%. In order to ensure formability of the steel sheet and the surface quality by limiting the amount of solute Ti, it is more preferable that the Ti content be equal to or less than 0.050%.

N is an element that increase the strength of steel and thus declines formability. In order to ensure sufficient formability, the upper limit of the N content is preferably 0.0045%. When a particularly high formability is needed, the N content is more preferably equal to or less than 0.003%, and more preferably equal to or less than 0.002%. A lower amount of N is preferable in view of formability of the steel sheet. However, in order to reduce the N content to be less than 0.0005%, excessive costs are needed. Accordingly, the lower limit of the N content is preferably 0.0005%.

In the embodiment, in addition to the compositions described above, in order to fix C and N in steel as carbide and nitride, Nb may be further added under addition of Ti described above as an additional composition. In order to sufficiently exhibit the fixing effect of C and N due to the addition of Nb, adding an amount equal to or more than 0.002% of Nb is preferable, and containing an amount equal to or more than 0.005% of Nb is more preferable. When more than 0.10% of Nb is added, the fixing effect of C and N is reduced. Accordingly, in order to suppress the costs of alloy additives, it is preferable that the upper limit of the Nb content be 0.10%. In order to limit an increase in the recrystallization temperature of the steel sheet and ensure productivity of a hot dip galvanization production line, it is more preferable that the Nb content be equal to or less than 0.050%.

In the embodiment, as an additional composition for improving secondary workability, 0.0001 to 0.003% of B may be contained in the steel sheet. That is, in order to sufficiently improve secondary workability, it is preferable that the B content be equal to or more than 0.0001%. When more than 0.003% of B is added, there may be the case where the effect of improving secondary workability is reduced and thus formability is declined. Accordingly, when B is added, it is preferable that the B content be equal to or less than 0.003%. Particularly, when high deep drawability is needed, it is more preferable that the B content be equal to or less than 0.0015%.

In the embodiment, the O (oxygen) content in the steel sheet is not particularly limited. However, there may be the case where O generates an oxide based inclusion and thus reduces the formability and corrosion resistance of the steel. Accordingly, it is preferable that the O content be equal to or less than 0.007%. A lower O content is preferable in view of the formability and corrosion resistance of steel.

In addition, for the purpose of further improving corrosion resistance and hot workability of the steel sheet itself, or as inevitable impurities from auxiliary materials such as scrap, the steel sheet in the embodiment may contain, in addition to the above-mentioned compositions, other alloy elements. As the alloy elements, there are Cu, Ni, Cr, Mo, W, Co, Ca, Y, Ce, La, Nd, Pr, Sm, V, Zr, Ta, Hf, Pb, Sn, Zn, Mg, As, Sb, and Bi. For example, when the total content of such other alloy elements is equal to or less than 1% (including 0%), the formability of the steel sheet is sufficient. Therefore, when an amount equal to or less than 1% of the above-mentioned other alloy elements is included in the steel sheet, such case is not excluded from the scope of the present invention.

It is preferable that the r-value of the ultra low carbon steel sheet be 1.6 to 2.2. When the r-value is equal to or higher than 1.6, sufficient plastic anisotropy is exhibited, and thus deep drawability of the steel sheet itself is good. Accordingly, it is preferable that the r-value be equal to or higher than 1.6. In addition, in consideration of the costs needed for production and industrial production difficulty, the r-value may be equal to or lower than 2.2.

On the other hand, in a high-strength steel sheet, the C content contained in steel is generally high, and thus deformation around hard phases included in steel is uneven, so that it is difficult to obtain a high r-value. As a method for improving deep drawability and formability of a steel sheet having such a low r-value, forming the composite oxide layer 5 of Mn, Zn, and P on the galvannealed layer 2 is effective. By forming the composite oxide layer 5 of Mn, Zn, and P on the high-strength galvannealed steel sheet, the high-strength steel sheet can be used for a component having a complex shape that could not be applied with a high-strength steel sheet until now.

Specifically, it is preferable to use a steel sheet containing by mass an amount more than 0.004% and equal to or less than 0.3% of C, an amount equal to or more than 0.001% and equal to or less than 2% of Si, an amount equal to or more than 0.01% and equal to or less than 4.0% of Mn, an amount equal to or more than 0.001% and equal to or less than 0.15% of P, an amount equal to or less than 0.015% of S, an amount equal to or more than 0.001% and equal to or less than 2% of Al, an amount equal to or more than 0.0005% and equal to or less than 0.004% of N, and the balance composed of Fe and inevitable impurities.

As described above, the reason the preferable range of each composition in the high-strength steel sheet is limited is as follows.

C is an element that increases the strength of steel, and it is preferable more than 0.004% of C be contained for the purpose of increasing the tensile strength of the steel sheet. As the amount of added C is increased, the ratio of the hard structure in the steel sheet is increased, and strength is also increased, so that a larger amount of added C is preferable. However, in order to ensure formability, the upper limit of the C content is preferably 0.3%, and more preferably, 0.2%.

Si is an element that increases strength without significantly declining the formability, and particularly, the elongation, of the steel sheet, and it is preferable that an amount equal to or more than 0.001% of Si be added. In addition, with an increase in the Si content, the strength is increased, and thus the ductility is declined. Particularly, when the Si content is higher than 2.0%, the effect of increasing strength is saturated, and only a decline of ductility occurs. Accordingly, in order to increase the strength and ensure the ductility, it is preferable that the upper limit of the Si content be 2.0%. In consideration of the balance between the strength and the ductility, it is preferable that the Si content be equal to or more than 0.1% and equal to or less than 2.0%.

Mn is added to increase the strength of the steel sheet. However, when the Mn content is excessive, cracking easily occurs in a slab, and the spot weldability also deteriorates. Accordingly, the upper limit of the Mn content is preferably 4.0%, and more preferably 3.0%. In addition, as the Mn content is reduced, better formability is exhibited. However, in order to limit the Mn content to be less than 0.01%, an extremely high refining costs are consumed. Accordingly, it is preferable that the lower limit of the Mn content be 0.01%. In addition, in order to obtain a steel sheet having both strength and formability, such as a composite structure steel sheet, it is preferable that the Mn content be equal to or more than 1.5%.

P is added as an element that increases the strength without significantly declining the formability, and particularly, the elongation, of the steel sheet. Here, when P is excessively added, intergranular embrittlement due to intergranular segregation and deterioration of weldability occur. Accordingly, it is preferable that the suitable range of the P content be equal to or less than 0.15%. In order to reduce the P content to be less than 0.001% an extremely high refining costs are consumed. Accordingly, it is preferable that the lower limit of the P content be 0.001%. In terms of the balance between strength, formability, and costs, it is more preferable that the P content be 0.02 to 0.1%.

S is an element that decreases the hot workability and the corrosion resistance of steel. Accordingly, a smaller S content is preferable. Therefore, it is preferable that the upper limit of the S content be 0.015%. In addition, it is more preferable that the S content be equal to or less than 0.010%. Here, in order to reduce the S content in low carbon steel (high-strength steel), a high refining costs are consumed. In addition, in view of formability and plating adhesion, there is no need to excessively reduce S. Accordingly, S may be reduced to a level needed for steel sheet properties such as hot workability and corrosion resistance.

Al accelerates ferrite formation in a steel structure and thus enhances ductility. However, when Al is excessively added, the above-described effect is saturated, and the amount of inclusion becomes too high, so that hole expandability is deteriorated.

Accordingly, it is preferable that the upper limit of the Al content be 2.0%. The lower limit of the Al content is not particularly limited. Since it is difficult to limit the Al content to be less than 0.0005%, the lower limit of the Al content may be 0.0005%. In addition, in order to apply Al as a deoxidizing material, the lower limit of the Al content may be equal to or more than 0.001%.

N forms coarse nitrides and deteriorates bendability and hole expandability. Accordingly, there is a need to suppress the N content. Specifically, in order to suppress the formation of coarse nitride and ensure bendability and hole expandability, it is preferable that the range of the N content be equal to or less than 0.004%. Furthermore, N is a cause of blowhole generation in welding, so that a lower amount of N is preferable. The lower limit of the N content does not influence the effect of the invention, and thus is not particularly limited. When the N content is less than 0.0005%, there may be the case where production costs are significantly increased. Accordingly, the lower limit of the N content may be 0.0005%.

In addition, for the purpose of further improving corrosion resistance and hot workability of the steel sheet itself, or as inevitable impurities from auxiliary materials such as scrap, the high strength steel sheet in the embodiment may contain, as well as the above-mentioned compositions, other alloy elements. As the alloy elements, there are Ti, Nb, B, Cu, Ni, Cr, Mo, W, Co, Ca, Y, Ce, La, Nd, Pr, Sm, V, Zr, Ta, Hf, Pb, Sn, Zn, Mg, As, Sb, and Bi. For example, when the total content of such other alloy elements is equal to or less than 1% (including 0%), the formability of the steel sheet is sufficient. Therefore, when an amount equal to or less than 1% of the above-mentioned other alloy elements is included in the steel sheet, the steel sheet does not depart from the scope of the present invention.

The steel sheet 1 (base steel sheet) according to the embodiment may be produced by applying a typical producing process for a hot-rolled steel sheet (hot strip) or a cold-rolled steel sheet (cold strip). The steel sheet 1 according to the embodiment which is any of the cold-rolled steel sheet and the hot-rolled steel sheet sufficiently exhibits the effect of enhancing deep drawability, and thus is not largely changed by the history (production process) of the steel sheet. In addition, as for production conditions such as a hot rolling condition, a cold rolling condition, and an annealing condition, predetermined conditions may be selected in response to dimensions of the steel sheet 1 and the necessary strength. The advantageous effect of enhancing deep drawability or the like is not compromised by the production conditions such as the hot rolling condition, the cold rolling condition, and the annealing condition.

Further, the thickness of the steel sheet 1 does not result in limitations of the embodiment. A steel sheet having a thickness that is typically allowed can apply the embodiment.

The forming method of the galvanized layer is not particularly limited. For example, in order to form the hot dip galvanized layer, typical hot dip galvanization using a non-oxidation furnace system or an all-radiant system may be applied. In addition, the alloying conditions are not particularly limited. In the alloying conditions, for example, ranges of a treatment temperature from 460 to 600° C. and a treatment time of 10 to 90 seconds are suitable in practical operations.

The galvannealed steel sheet after being subjected to alloying is subjected to skin pass rolling for the purpose of suppressing generation of stretcher strain. In skin pass rolling, the protruded portion 23 which is a portion of the galvannealed surface is subjected to compressive deformation by a mill roll, and as illustrated in FIG. 1B, the flat portion 3 is formed in the protruded portion 23 which is the part of the galvannealed surface. Moreover, a depressed part which is a portion of the galvannealed surface is not subjected to compressive deformation, and thus remains on the galvannealed surface as the rough portion 4. In order to allow the area ratio of the flat portion 3 on the galvannealed surface to be equal to or higher than 10%, it is preferable that a roll having a work roll diameter of equal to or smaller than 700 mm be used to perform skin pass rolling at an elongation ratio of equal to or higher than 0.3%.

The area ratio of the flat portion is determined according to rolling reduction amount per unit area. However, the rolling reduction amount per unit area is reduced as the work roll diameter is increased under a constant rolling force. Accordingly, when the work roll diameter is greater than 700 mm, a high rolling force is needed to obtain a target area ratio, and thus the quality of the galvannealed steel sheet deteriorates. Therefore, it is preferable that the work roll diameter to be equal to or smaller than 700 mm. In addition, as the work roll diameter is reduced, the rolling reduction amount per unit area is increased, and thus the flat portion 3 having a larger area ratio can be obtained under the same rolling force. Accordingly, a smaller work roll diameter is preferable, and a work roll diameter of equal to or smaller than 600 mm is more preferable.

In the same manner, in order to obtain the flat portion 3 having an area ratio of equal to or higher than 10%, it is preferable that the elongation ratio (in skin pass rolling, in order to increase precision of sheet thickness, the elongation ratio is used instead of a rolling reduction ratio as the deformation degree) be equal to or higher than 0.3%.

On the other hand, when the ratio 2R/t of the work roll diameter (2R) to the thickness (t) of a steel strip (the galvannealed steel sheet) is lower than 400, a desired surface profile cannot be obtained. Therefore, the work roll diameter is set to be equal to or greater than 300 mm.

In addition, when the elongation ratio is too high, the material of the galvannealed steel sheet deteriorates, so that it is preferable that the elongation ratio be equal to or lower than 2.0%.

The type of the roll is not particularly limited. In order to easily obtain a flat galvannealed surface, a bright roll is preferably used instead of a dull roll. Particularly, when a bright roll having a roughness of smaller than 0.5 μm is used, the flat portion 3 having a surface roughness Ra of smaller than 0.5 μm can be easily produced. Accordingly, the bright roll having a roughness of smaller than 0.5 μm is more preferably used.

Thereafter, the composite oxide layer 5 of Mn, Zn, and P is formed on the surface (one surface or all surfaces) of the galvannealed layer. In order to form the composite oxide layer 5 according to the embodiment, potassium permanganate and at least one of phosphoric acid, phosphorous acid, and hypophosphorous acid are combined with the treatment liquid, and the resultant treatment liquid may be allowed to react with the galvannealed steel sheet. Due to the reaction between the galvannealed steel sheet and the treatment liquid, dissolution of Zn and reduction of permanganate ions occur, and thus the pH at the reaction interface rapidly increases. A film mainly containing Mn oxide or Mn hydroxide is formed at the reaction interface, the pH at the reaction interface is decreased due to the film formation, and the formed film is hydrolyzed. Due to the hydrolysis, the Mn oxide or the Mn hydroxide is changed into phosphate, phosphite, or hypophosphite having a lower solubility, and a film is re-formed. This repetition (reaction cycles of dissolution, reduction, and hydrolysis, or the like) occurs within a short time thereby obtaining the composite oxide layer 5 of Mn, Zn, and P.

In addition, in order to perform application of the treatment liquid, a roll coater may be used. In comparison with a different typical application method, when application using a roll coater is performed, installation of an application apparatus is easy and requires low cost. In addition, adjustment for applying an adequate amount of the treatment liquid to achieve a proper surface distribution can be precisely and easily performed. In addition, after the application of the treatment liquid, a process of washing and removing the remaining treatment liquid or the like is not necessarily needed. In addition, right after applying the treatment liquid, reaction between the treatment liquid and the surface of the galvanized layer is started, so that the reaction can be terminated within a short time. In addition, since a process such as washing is not necessarily needed, the aqueous P compound can easily remain in the composite oxide layer 5.

In this case, by adjusting the treatment liquid and reaction conditions, the residual amount of the aqueous P compound can be accurately adjusted.

In a production method of the galvannealed steel sheet according to the embodiment, for example, roll coaters as illustrated in FIGS. 2A, 2B, 3A, and 3B may be used to apply the treatment liquid. The roll coater 20 of FIG. 2A includes a solution holding part 21 at the center of the longitudinal direction thereof. The solution holding part 21 is configured by winding, for example, a rubber lining around a cylindrical base member. In the solution holding part 21, a plurality of steel contact parts 23 (protruded portion) are lined at equal intervals along the longitudinal direction thereof. The steel contact part 23 corresponds to an outermost part of a radial direction in the solution holding part 21. A recessed portion 24 is formed between the steel contact parts 23 which are adjacent along the longitudinal direction of the roll coater 20. As the solution holding part 21 comes in contact with the treatment liquid filled in a coater pan that is not shown, the treatment liquid is attached to the solution holding part 21. Here, an amount of the treatment liquid attached to the roll coater 20 is not uniform along the longitudinal direction, and a larger amount of the treatment liquid is attached to the vicinity of the recessed portion 24 than the vicinity of the steel contact part 23.

The roll coater 20 to which the treatment liquid is attached is pressed by a steel sheet (strip) at a prescribed nip pressure while rotating about its shaft. Simultaneously, the steel sheet is transported to a downstream side. Here, each steel contact part 23 of the roll coater 20 comes in contact with the steel sheet, and thus the treatment liquid from the entire solution holding part 21 is applied to the steel sheet.

When the vicinity of a part of the surface of the steel sheet which comes in contact with the steel contact part 23 is referred to as a first applied part, a plurality of the first applied parts each in a strip shape is distributed along the transport direction of the steel sheet into a stripe shape. In addition, a second applied part is formed on the surface of the steel sheet between the first applied parts. The treatment liquid attached to the vicinity of the recessed portion 24 of the roll coater 20 is applied to the second applied part. By adjusting the nip pressure of the roll coater 20, the sizes of the first and second applied parts and the amount of the treatment liquid applied to each applied part can be adjusted. In addition, in order to adjust the amount of the treatment liquid applied, for example, the width or the depth of the recessed portion 24 of the roll coater 20 may be adjusted.

Figure 3A:
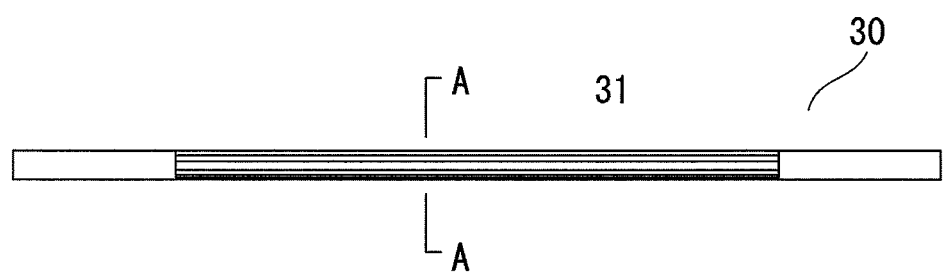
FIG. 3A is a schematic view of another roll coater for producing the galvannealed steel sheet according to the embodiment of the present invention.

FIG. 3A illustrates a roll coater 30 of another configuration. The roll coater 30 has a solution holding part 31 at the center part of the longitudinal direction. The solution holding part 31 is formed, for example, by performing a process of cutting grooves at the surface of a cylindrical roll coater main body along an axial direction at equal intervals of a circumferential direction.

Figure 3B:
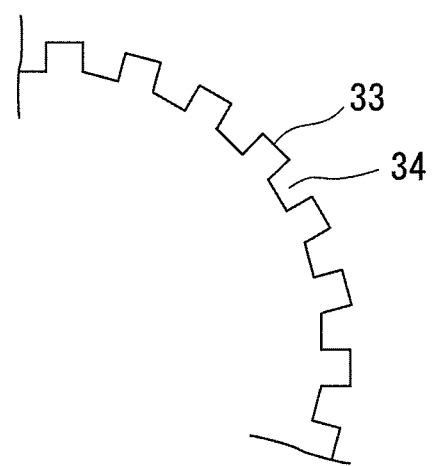
FIG. 3B is a partial enlarged view of an A-A cross-section of a solution holding part of the roll coater of FIG. 3A.

FIG. 3B is a cross-sectional view taken along the A-A surface which is perpendicular to the axial direction of the roll coater 30. As a result of the groove-cutting process, a plurality of steel contact parts 33 (protruded portions) are lined at equal intervals on the surface of the solution holding part 31 of the roll coater 30 along the circumferential direction. A recessed portion 34 is formed between the steel contact parts 33 which are adjacent in the circumferential direction.

Figure 2A:
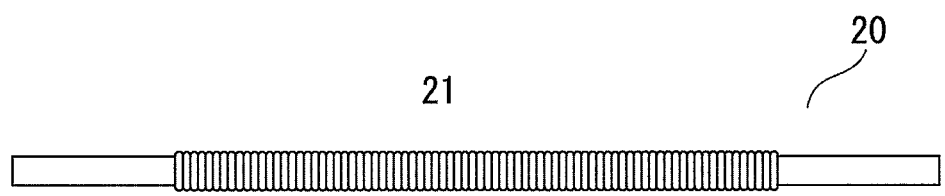
FIG. 2A is a schematic view of a roll coater for producing the galvannealed steel sheet according to the embodiment of the present invention.
Figure 2B:
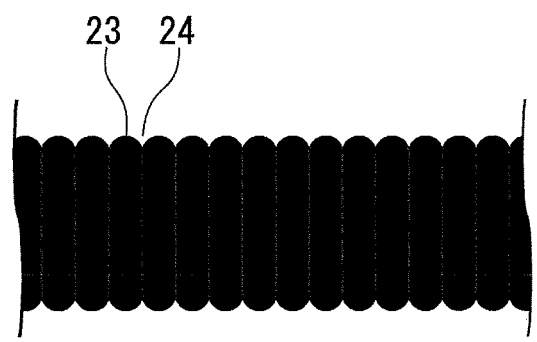
FIG. 2B is an enlarged view of a solution holding part of the roll coater of FIG. 2A.

As in the case where the roll coater 30 of FIG. 2A is used, the application is performed at a prescribed nip pressure.

When the vicinity of a part of the surface of the steel sheet which comes in contact with the steel contact part 33 is referred to as a first applied part, a plurality of the first applied parts each in a strip shape is distributed into a stripe shape which is perpendicular to the transport direction of the steel sheet. In addition, a second applied part is formed on the surface of the steel sheet between the first applied parts. The treatment liquid attached to the vicinity of the recessed portion 34 of the roll coater 30 is applied to the second applied part.

For example, the width of the steel contact part 33 along the circumferential direction is set to 0.7 mm, the width of the recessed portion 34 is set to 0.3 mm, and the nip pressure is adequately adjusted, so that the total size of the area in which the attached amount of P is equal to or greater than 20 mg/m$^2$ in the mixed layer of the galvannealed steel material can be about 30% of the surface area of the mixed layer.

When either of the roll coaters 20 and 30 is used, generally, in many cases, a larger amount of the treatment liquid is applied to the second applied part than the first applied part. Here, by adjusting the nip pressure, the groove depth, and the viscosity of the treatment liquid, on the contrary to the above case, adjustment for applying a larger amount of the treatment liquid to the first applied part than the second applied part can be made. In any case, an application concentration distribution in a substantially regular stripe shape is formed on the surface of the steel sheet.

In addition, the composite oxide layer 5 of Mn, Zn, and P may also be formed on the surface of the galvannealed steel sheet by a contact method such as immersion or application or an electrochemical method such as electrolysis performed at a current density of 5 to 60 A/dm$^2$. In addition, as needed, before forming an inorganic oxide (composite oxide), the galvannealed steel sheet may be subjected to preprocessing by a chemical method using an alkali, an acid, or the like or a physical method using a brush or the like.

By allowing an adequate amount of the aqueous P compound in the treatment liquid to remain in the composite oxide of Mn, Zn, and P, it becomes possible to form a target mixed layer of the composite oxide of Mn, Zn, and P and the aqueous P compound.

Moreover, after galvannealing, or after forming the mixed layer of the composite oxide of Mn, Zn, and P and the aqueous P compound, a typical skin pass rolling or the like may be performed.

Collectively, the galvannealed steel sheet 10 may be produced by the following method. That is, the steel sheet 1 is subjected to hot dip galvanization and the alloying to form the galvannealed layer 2 including an amount equal to or more than 0.05% and equal to or less than 0.5% of Al and an amount equal to or more than 6% and equal to or less than 12% of Fe. After skin pass rolling at an elongation ratio of equal to or higher than 0.3%, the composite oxide layer 5 of Mn, Zn, and P is formed on the surface of the galvannealed layer 2 by controlling the treatment liquid so that the composite oxide layer 5 of Mn, Zn, and P includes an amount equal to or more than 0.1 mg/m$^2$ and equal to or less than 100 mg/m$^2$ of Mn, an amount equal to or more than 1 mg/m$^2$ and equal to or less than 100 mg/m$^2$ of P and the P/Mn ratio is 0.3 to 50. Here, it is preferable that skin pass rolling be performed to achieve an elongation ratio of equal to or higher than 0.3% and equal to or lower than 2.0% using the roll having a work roll diameter of equal to or greater than 300 mm and equal to or smaller than 700 mm. In addition, it is preferable that the bright roll having a roughness of smaller than 0.5 μm be used in skin pass rolling. It is preferable that the treatment liquid include potassium permanganate and at least one kind of phosphoric acid, phosphorous acid, and hypophosphorous acid. Moreover, it is preferable that the treatment liquid be applied on the surface of the galvannealed layer 2 using the roll coater.

EXAMPLES

Hereinafter, the galvannealed steel sheet 10 according to the embodiment and the production method thereof will be described in detail in Examples.

Example 1

A slab having a composition of Table 1 was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing on the hot-rolled steel strip, cold rolling was performed thereon to produce a cold-rolled steel strip of 0.8 mm. Moreover, using a continuous hot dip galvanizing equipment in an in-line annealing system, annealing, hot dip galvanizing, and alloying were performed on the cold-rolled steel strip thereby producing a galvannealed steel sheet. During the galvannealing, an annealing atmosphere was a mixed gas of 5 vol % of hydrogen and 95 vol % of nitrogen, the annealing temperature was 800 to 840° C., and the annealing time was 90 seconds. As a hot dip galvanizing bath, a hot dip galvanizing bath having an effective Al concentration of 0.105% (Al concentration that can be used as metal) in the bath was used, and the attached amount of zinc was adjusted to 50 g/m$^2$ using a gas wiper. During heating in alloying, heating equipment in an induction heating system was used to perform the alloying at 440 to 550° C.

The produced galvannealed steel sheet was cut into a plurality of cut sheets, and treatment solutions in which the concentration of potassium permanganate and the concentration of phosphoric acid were different were applied to the cut sheets to react with the galvannealed surface, thereby producing each test sample. The roll coater was used to apply the treatment liquids, and a distribution of the attached amount of P was changed by changing the interval of the grooves of the roll coater.

In order to obtain Fe % and Al % in the galvannealed layer, and a P concentration and an Mn concentration in the mixed layer of the composite oxide of Mn, Zn, and P and the aqueous P compound, the galvannealed steel sheet was dissolved using hydrochloride including an inhibitor. On the samples, measurement according to an ICP (Inductively-Coupled Plasma) method was performed. The sample was cut into a shape having a diameter of 50 mm such that the galvannealed layer was dissolved to be used for measurement.

An amount of each phase ($\eta$ phase, $\zeta$ phase, and $\Gamma$ phase) in the galvannealed layer of the galvannealed steel sheet was evaluated by measuring the X-ray diffraction intensity of each phase by X-ray diffractometry and by using the ratio (I$\eta$/ISi, I$\zeta$/ISi, and I$\Gamma$/ISi) of the X-ray diffraction intensity of each phase to the X-ray diffraction intensity ISi of d=3.13 Å of a Si powder standard sheet.

Moreover, as described above, the X-ray diffraction intensity I$\eta$ of d=1.237 Å was used for the $\eta$ phase, the X-ray diffraction intensity I$\zeta$ of d=1.26 Å was used for the $\zeta$ phase, and the X-ray diffraction intensity I$\Gamma$ of d=1.222 Å was used for the $\Gamma$ phase.

With regard to kinds of the P compound in the mixed layer of the composite oxide of Mn, Zn, and P and the aqueous P compound, existence of $PO_4^{3-}$ was confirmed using a phosphorus molybdenum blue method to measure qualitative properties.

The content of the aqueous P compound was obtained by immersing the samples in boiling water for 30 minutes, and measuring the difference between amounts of P adhesion before and after the immersion. A fluorescent X-ray measurement apparatus was used for measuring the attached amount, and a calibration curve was generated in advance using a standard sample. An area having a diameter of 20 mm was measured at three points and an average value of the results was used as the representative value.

A distribution of the amounts of P adhesion was obtained by measuring a range of 10×10 mm using an Electron Probe Microanalyzer (EPMA) having a probe diameter of 1 μm or a CMA. The amount of attached P was calculated from the X-ray intensity. An area having an attached amount of P equal to or greater than 20 mg/m$^2$ was obtained. And this value was divided by the entire measured area, thereby obtaining an area ratio. Ten arbitrary points on the sample was measured, and the average value was used as a representative value.

The distribution of P/Mn was similarly obtained by measuring a range of 10×10 mm using an EPMA having a probe diameter of 1 μm. The amount of attached P and the amount of attached Mn were obtained from the X-ray intensities and areas in which the ratios thereof are equal to or greater than 3 were calculated. A ratio was obtained by dividing this value by the entire measured area. Ten arbitrary points on the sample were measured, and the average value was used as a representative value.

With regard to formability, by performing a TZP test having the following conditions, a blank diameter at which a forming margin T of Formula (1) as follows became 0 was evaluated as a limiting drawing ratio (LDR).

Blank diameter (D$_0$): ø90 to ø125 mm
Tool size:
Punch diameter (D$_0$): ø50 mm, punch shoulder radius: 5 mm
Die hole diameter: ø51.6 mm, die shoulder radius: 5 mm
BHF (blank holding force):
In measurement of forming load (P): 25 kN
In measurement of fracture load (P$_f$): 200 kN
Lubricating oil: rust resistant oil
Evaluated value: forming allowance T $$T=(P_f-P)/P_f \quad (1)$$

Formability was compared to the limiting drawing ratio of a non-treated steel sheet and evaluated into the following classifications. In the case of the classification C and D, the formability of the sample was evaluated as Fail.

A: the limiting drawing ratio increased by equal to or more than 0.10
B: the limiting drawing ratio increased by equal to or more than 0.06 and less than 0.10
C: the limiting drawing ratio increased by equal to or more than 0.01 and less than 0.06
D: the limiting drawing ratio increased by less than 0.01

An adhesion test was performed as follows. The sample was cut into 150×25 mm, an adhesive was applied to be adhered at an adhesion area of 25×12.5 mm, baking was performed at 170° C. for 20 minutes, and thereafter, a shear test was performed. As the adhesive, an epoxy-based construction adhesive and a PVC-based mastic adhesive were used and evaluated into the following classifications. The classification D was evaluated as Fail in adhesion.

A: interface exfoliation at the interface between the galvannealed layer and the steel sheet B: equal to or higher than 90% of cohesive failure of the adhesive, equal to or lower than 10% of interface exfoliation at the interface between the galvannealed layer and the adhesive C: higher than 10% and lower than 90% of cohesive failure of the adhesive, higher than 10% and lower than 90% of interface exfoliation at the interface between the galvannealed layer and the adhesive D: equal to or lower than 10% of cohesive failure of the adhesive, equal to or higher than 90% of interface exfoliation at the interface between the galvannealed layer and the adhesive.

The results of the adhesion test are shown in Tables 2 and 3. In Nos. 1, 8, 14, 20, 26, 33, 39, 45, and 51, the ratios of the area in which the attached amount of P is equal to or greater than 20 mg/m$^2$ were lower than the range of the present embodiment, so that the enhancement of formability was insufficient. In Nos. 7, 13, 19, 25, 32, 38, 44, 50, and 56, the ratios of the area in which the attached amount of P is equal to or greater than 20 mg/m$^2$ were higher than the range of the present embodiment, so that a reduction in adhesion could be observed. Products according to the embodiment other than those numbers could enhance formability without declining adhesion.

TABLE 1

| Symbol | Chemical Component (mass %) | | | | | | | | | |
|---|---|---|---|---|---|---|---|---|---|---|
| | C | Si | Mn | P | S | Al | Ti | Nb | N | B |
| A | 0.0018 | 0.002 | 0.06 | 0.011 | 0.007 | 0.027 | 0.033 | — | 0.0022 | 0.0002 |
| B | 0.0006 | 0.002 | 0.06 | 0.01 | 0.004 | 0.048 | 0.024 | — | 0.0016 | — |
| C | 0.001 | 0.003 | 0.07 | 0.004 | 0.007 | 0.028 | 0.032 | 0.009 | 0.0017 | — |
| D | 0.0009 | 0.006 | 0.03 | 0.005 | 0.004 | 0.032 | 0.011 | 0.027 | 0.0014 | 0.0004 |
| E | 0.0005 | 0.009 | 0.02 | 0.004 | 0.006 | 0.026 | 0.025 | 0.009 | 0.0018 | — |
| F | 0.0025 | 0.004 | 0.11 | 0.01 | 0.006 | 0.031 | 0.029 | 0.01 | 0.0039 | — |
| G | 0.0014 | 0.008 | 0.16 | 0.016 | 0.005 | 0.027 | 0.027 | 0.029 | 0.0014 | — |
| H | 0.0018 | 0.13 | 0.05 | 0.009 | 0.006 | 0.027 | 0.021 | 0.038 | 0.0022 | — |
| I | 0.0032 | 0.009 | 0.08 | 0.013 | 0.007 | 0.033 | 0.012 | 0.007 | 0.0042 | — |

TABLE 2

| No. | Kind of Sheet | Fe % in Galvannealed Layer | Al % in Galvannealed Layer | X-ray Diffraction Intensity in Galvannealed Layer Iη/ISi | X-ray Diffraction Intensity in Galvannealed Layer Iξ/ISi | X-ray Diffraction Intensity in Galvannealed Layer IΓ/ISi | Composite Oxide of Mn, Zn, and P — P Content (mg/m²) | Composite Oxide of Mn, Zn, and P — Mn Content (mg/m²) | Composite Oxide of Mn, Zn, and P — P/Mn | Composite Oxide of Mn, Zn, and P — Kind of P Compound | Aqueous P Compound (%) | Area Ratio (%) of equal to or higher than 20 mg/m² | Area Ratio (%) of P/Mn ≥ 3 | Form-ability | Adhesive Epoxy Based | Adhesive PVC Based | Note |
|---|---|---|---|---|---|---|---|---|---|---|---|---|---|---|---|---|---|
| 1 | Steel Sheet A | 10.6 | 0.25 | 0 | 0.015 | 0.0005 | 19 | 15 | 1.27 | PO₃³⁻ | 18 | 10 | 0 | C | A | A | Comparative Example |
| 2 | " | 10.6 | 0.25 | 0 | 0.015 | 0.0005 | 13 | 11 | 1.18 | PO₃³⁻ | 47 | 23 | 0 | B | A | A | Example of Invention |
| 3 | " | 10.6 | 0.25 | 0 | 0.015 | 0.0005 | 21 | 17 | 1.24 | PO₃³⁻ | 16 | 20 | 1 | A | A | A | " |
| 4 | " | 10.6 | 0.25 | 0 | 0.015 | 0.0005 | 26 | 19 | 1.37 | PO₃³⁻ | 23 | 40 | 6 | A | A | B | " |
| 5 | " | 10.6 | 0.25 | 0 | 0.015 | 0.0005 | 30 | 21 | 1.43 | PO₄³⁻ | 27 | 60 | 12 | A | A | B | " |
| 6 | " | 10.6 | 0.25 | 0 | 0.015 | 0.0005 | 35 | 23 | 1.52 | PO₄³⁻ | 31 | 80 | 20 | A | A | C | " |
| 7 | " | 10.6 | 0.25 | 0 | 0.015 | 0.0005 | 42 | 28 | 1.50 | PO₄³⁻ | 30 | 90 | 22 | C | C | D | Comparative Example |
| 8 | Steel Sheet B | 9.6 | 0.24 | 0 | 0.0025 | 0.0004 | 16 | 15 | 1.07 | PO₄³⁻ | 5 | 5 | 0 | B | A | A | " |
| 9 | " | 9.6 | 0.24 | 0 | 0.0025 | 0.0004 | 20 | 18 | 1.11 | PO₄³⁻ | 7 | 21 | 0 | B | A | A | Example of Invention |
| 10 | " | 9.6 | 0.24 | 0 | 0.0025 | 0.0004 | 26 | 25 | 1.04 | PO₄³⁻ | 3 | 44 | 0 | A | A | B | " |
| 11 | " | 9.6 | 0.24 | 0 | 0.0025 | 0.0004 | 29 | 23 | 1.26 | PO₄³⁻ | 18 | 59 | 8 | A | A | B | " |
| 12 | " | 9.6 | 0.24 | 0 | 0.0025 | 0.0004 | 34 | 29 | 1.17 | PO₄³⁻ | 11 | 78 | 7 | A | A | C | " |
| 13 | " | 9.6 | 0.24 | 0 | 0.0025 | 0.0004 | 43 | 34 | 1.26 | PO₄³⁻ | 17 | 94 | 12 | C | C | D | Comparative Example |
| 14 | Steel Sheet C | 11.8 | 0.25 | 0 | 0.0005 | 0.0004 | 18 | 16 | 1.13 | PO₄³⁻ | 9 | 3 | 0 | A | A | A | " |
| 15 | " | 11.8 | 0.25 | 0 | 0.0005 | 0.0004 | 23 | 19 | 1.21 | PO₄³⁻ | 15 | 23 | 2 | A | A | A | Example of Invention |
| 16 | " | 11.8 | 0.25 | 0 | 0.0005 | 0.0004 | 27 | 17 | 1.59 | PO₄³⁻ | 34 | 41 | 12 | A | A | B | " |
| 17 | " | 11.8 | 0.25 | 0 | 0.0005 | 0.0004 | 31 | 20 | 1.55 | PO₄³⁻ | 33 | 62 | 17 | A | A | B | " |
| 18 | " | 11.8 | 0.25 | 0 | 0.0005 | 0.002 | 34 | 21 | 1.62 | PO₄³⁻ | 35 | 77 | 24 | A | A | C | " |
| 19 | " | 11.8 | 0.25 | 0 | 0.0005 | 0.002 | 46 | 27 | 1.70 | PO₄³⁻ | 38 | 97 | 34 | C | C | D | Comparative Example |
| 20 | Steel Sheet D | 9.1 | 0.24 | 0 | 0.0075 | 0.0003 | 17 | 12 | 1.42 | PO₄³⁻ | 27 | 8 | 0 | A | A | A | " |
| 21 | " | 9.1 | 0.24 | 0 | 0.0075 | 0.0003 | 21 | 15 | 1.40 | PO₄³⁻ | 25 | 24 | 5 | C | A | B | Example of Invention |
| 22 | " | 9.1 | 0.24 | 0 | 0.0075 | 0.0003 | 24 | 17 | 1.41 | PO₄³⁻ | 26 | 37 | 7 | A | A | B | " |
| 23 | " | 9.1 | 0.24 | 0 | 0.0075 | 0.0003 | 28 | 19 | 1.47 | PO₄³⁻ | 29 | 56 | 13 | A | A | B | " |
| 24 | " | 9.1 | 0.24 | 0 | 0.0075 | 0.0003 | 33 | 25 | 1.32 | PO₄³⁻ | 21 | 80 | 12 | A | A | C | " |
| 25 | " | 9.1 | 0.24 | 0 | 0.0075 | 0.0003 | 40 | 22 | 1.82 | PO₄³⁻ | 42 | 93 | 38 | C | C | D | Comparative Example |
| 26 | Steel Sheet E | 10.3 | 0.24 | 0 | 0.0019 | 0.0005 | 19 | 17 | 1.12 | PO₄³⁻ | 16 | 12 | 0 | A | A | A | " |
| 27 | " | 10.3 | 0.24 | 0 | 0.0019 | 0.0005 | 21 | 17 | 1.24 | PO₄³⁻ | 17 | 22 | 2 | A | A | A | Example of Invention |
| 28 | " | 10.3 | 0.24 | 0 | 0.0019 | 0.0005 | 14 | 13 | 1.08 | PO₄³⁻ | 4 | 35 | 0 | B | A | B | " |
| 29 | " | 10.3 | 0.24 | 0 | 0.0019 | 0.0005 | 25 | 19 | 1.32 | PO₄³⁻ | 22 | 39 | 6 | A | A | B | " |
| 30 | " | 10.3 | 0.24 | 0 | 0.0019 | 0.0005 | 30 | 21 | 1.43 | PO₄³⁻ | 27 | 63 | 13 | A | A | B | " |
| 31 | " | 10.3 | 0.24 | 0 | 0.0019 | 0.0005 | 34 | 24 | 1.42 | PO₄³⁻ | 26 | 79 | 16 | A | A | B | " |
| 32 | " | 10.3 | 0.24 | 0 | 0.0019 | 0.0005 | 44 | 30 | 1.47 | PO₄³⁻ | 29 | 96 | 22 | A | A | D | Comparative Example |

TABLE 3

| No. | Kind of Sheet | Fe % in Galvannealed Layer | Al % in Galvannealed Layer | X-ray Diffraction Intensity in Galvannealed Layer Iη/ISi | Iξ/ISi | IΓ/ISi | Composite Oxide of Mn, Zn, and P — P Content (mg/m²) | Mn Content (mg/m²) | P/Mn | Kind of P Compound | Aqueous P Compound (%) | Area Ratio (%) of equal to or higher than 20 mg/m² | Area Ratio (%) of P/Mn ≥ 3 | Form-ability | Adhesive Epoxy Based | Adhesive PVC Based | Note |
|---|---|---|---|---|---|---|---|---|---|---|---|---|---|---|---|---|---|
| 33 | Steel Sheet F | 11.2 | 0.25 | 0 | 0.001 | 0.0014 | 19 | 18 | 1.06 | PO₄³⁻ | 3 | 9 | 0 | C | A | A | Comparative Example |
| 34 | " | 11.2 | 0.25 | 0 | 0.001 | 0.0014 | 22 | 20 | 1.10 | PO₄³⁻ | 6 | 24 | 0 | B | A | A | Example of Invention |
| 35 | " | 11.2 | 0.25 | 0 | 0.001 | 0.0014 | 25 | 22 | 1.14 | PO₄³⁻ | 9 | 42 | 3 | A | A | B | Example of Invention |
| 36 | " | 11.2 | 0.25 | 0 | 0.001 | 0.0014 | 28 | 25 | 1.12 | PO₄³⁻ | 8 | 61 | 3 | A | A | B | Example of Invention |
| 37 | " | 11.2 | 0.25 | 0 | 0.001 | 0.0014 | 30 | 26 | 1.15 | PO₄³⁻ | 11 | 76 | 6 | A | A | C | Example of Invention |
| 38 | " | 11.2 | 0.25 | 0 | 0.001 | 0.0014 | 42 | 38 | 1.11 | PO₄³⁻ | 7 | 91 | 5 | A | C | D | Comparative Example |
| 39 | Steel Sheet G | 10.9 | 0.24 | 0 | 0.0013 | 0.001 | 19 | 16 | 1.19 | PO₄³⁻ | 13 | 16 | 0 | C | A | A | Comparative Example |
| 40 | " | 10.9 | 0.24 | 0 | 0.0013 | 0.001 | 20 | 15 | 1.33 | PO₄³⁻ | 23 | 21 | 3 | A | A | A | Example of Invention |
| 41 | " | 10.9 | 0.24 | 0 | 0.0013 | 0.001 | 25 | 19 | 1.32 | PO₄³⁻ | 21 | 38 | 6 | A | A | B | Example of Invention |
| 42 | " | 10.9 | 0.24 | 0 | 0.0013 | 0.001 | 30 | 23 | 1.30 | PO₄³⁻ | 20 | 58 | 9 | A | A | B | Example of Invention |
| 43 | " | 10.9 | 0.24 | 0 | 0.0013 | 0.001 | 35 | 30 | 1.17 | PO₄³⁻ | 12 | 77 | 6 | A | A | C | Example of Invention |

TABLE 3-continued

| No. | Kind of Sheet | Fe % in Galvannealed Layer | Al % in Galvannealed Layer | X-ray Diffraction Intensity in Galvannealed Layer Iη/ISi | X-ray Diffraction Intensity in Galvannealed Layer Iξ/ISi | X-ray Diffraction Intensity in Galvannealed Layer IΓ/ISi | Composite Oxide P Content (mg/m²) | Composite Oxide Mn Content (mg/m²) | P/Mn | Kind of P Compound | Aqueous P Compound (%) | Area Ratio (%) of equal to or higher than 20 mg/m² | Area Ratio (%) of P/Mn ≥ 3 | Formability | Adhesive Epoxy Based | Adhesive PVC Based | Note |
|---|---|---|---|---|---|---|---|---|---|---|---|---|---|---|---|---|---|
| 44 | " | 10.9 | 0.24 | 0 | 0.0013 | 0.001 | 45 | 34 | 1.32 | $PO_4^{3-}$ | 21 | 95 | 15 | A | C | D | Comparative Example |
| 45 | Steel Sheet H | 9.4 | 0.25 | 0 | 0.0038 | 0.0004 | 16 | 14 | 1.14 | $PO_4^{3-}$ | 11 | 4 | 0 | C | A | A | Comparative Example |
| 46 | " | 9.4 | 0.25 | 0 | 0.0038 | 0.0004 | 20 | 14 | 1.43 | $PO_4^{3-}$ | 27 | 23 | 5 | A | A | B | Example of Invention |
| 47 | " | 9.4 | 0.25 | 0 | 0.0038 | 0.0004 | 23 | 16 | 1.44 | $PO_4^{3-}$ | 28 | 36 | 8 | A | A | B | Example of Invention |
| 48 | " | 9.4 | 0.25 | 0 | 0.0038 | 0.0004 | 29 | 19 | 1.53 | $PO_4^{3-}$ | 32 | 64 | 17 | A | A | B | Example of Invention |
| 49 | " | 9.4 | 0.25 | 0 | 0.0038 | 0.0004 | 32 | 21 | 1.52 | $PO_4^{3-}$ | 31 | 79 | 20 | A | A | C | Example of Invention |
| 50 | " | 9.4 | 0.25 | 0 | 0.0038 | 0.0004 | 44 | 27 | 1.63 | $PO_4^{3-}$ | 36 | 92 | 29 | A | C | D | Comparative Example |
| 51 | Steel Sheet I | 11.5 | 0.24 | 0 | 0.0008 | 0.0016 | 15 | 11 | 1.36 | $PO_4^{3-}$ | 24 | 7 | 0 | C | A | A | Comparative Example |
| 52 | " | 11.5 | 0.24 | 0 | 0.0008 | 0.0016 | 18 | 15 | 1.20 | $PO_4^{3-}$ | 14 | 22 | 1 | A | A | A | Example of Invention |
| 53 | " | 11.5 | 0.24 | 0 | 0.0008 | 0.0016 | 23 | 19 | 1.21 | $PO_4^{3-}$ | 15 | 43 | 4 | A | A | B | Example of Invention |
| 54 | " | 11.5 | 0.24 | 0 | 0.0008 | 0.0016 | 26 | 16 | 1.63 | $PO_4^{3-}$ | 36 | 57 | 17 | A | A | B | Example of Invention |
| 55 | " | 11.5 | 0.24 | 0 | 0.0008 | 0.0016 | 31 | 20 | 1.55 | $PO_4^{3-}$ | 32 | 78 | 21 | A | A | C | Example of Invention |
| 56 | " | 11.5 | 0.24 | 0 | 0.0008 | 0.0016 | 40 | 19 | 2.11 | $PO_4^{3-}$ | 49 | 93 | 51 | A | C | D | Comparative Example |

Example 2

A slab having a composition of Symbol C of Table 1 was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing on the hot-rolled steel strip, cold rolling was performed thereon to produce a cold-rolled steel strip of 0.8 mm. Thereafter, using a continuous hot dip galvanizing equipment in an in-line annealing system, a galvannealed steel sheet was produced. During the galvannealing, an annealing atmosphere was a mixed gas of 5 vol % of hydrogen and 95 vol % of nitrogen, the annealing temperature was 800 to 840° C., and the annealing time was 90 seconds. As a hot dip galvanizing bath, a hot dip galvanizing bath having an effective Al concentration of 0.105% in the bath was used, and the attached amount of zinc was adjusted to 50 g/m² using a gas wiper. During heating in alloying, heating equipment in an induction heating system was used to perform the alloying at 440 to 550° C.

The produced galvannealed steel sheet was cut into a plurality of cut sheets, and treatment solutions in which the concentration of potassium permanganate and the concentration of phosphoric acid were different were applied to the cut sheets to react with the galvannealed surface, thereby producing each test sample. The roll coater was used to apply the treatment liquids, and a distribution of the attached amount of P was changed by changing the interval of the grooves of the roll coater.

Fe % and Al % in the galvannealed layer, a P concentration and an Mn concentration in the composite oxide layer of Mn, Zn, and P, and the thickness of the composite oxide layer of Mn, Zn, and P were measured as in Example 1.

With regard to kinds of the P compound in the composite oxide layer of Mn, Zn, and P, existence of $PO_4^{3-}$ was examined using a phosphorus molybdenum blue method. For the samples in which $PO_4^{3-}$ was not detected, the existence of oxoacid of phosphorus was detected using TOF-SIMS. With regard to the kinds of the P compound, when $PO_4^{3-}$ was detected using the phosphorus molybdenum blue method, the P compound was determined to be $PO_4^{3-}$. When the $PO_4^{3-}$ was not detected and oxoacid of phosphorus was detected, the P compound was determined to be $PO_3^{2-}$ or $PO_2^{-}$.

$I\eta/ISi$, $I\xi/ISi$, and $I\Gamma/ISi$ were measured as in Example 1. The content of the aqueous P compound, the distribution of the attached amount of P, and the distribution of P/Mn were also measured as in Example 1. Deep drawability and adhesion were evaluated under the same conditions as in Example 1.

The results are shown in Table 4. In No. 63, the ratio of the area in which the attached amount of P is equal to or greater than 20 mg/m² was lower than the range of the embodiment, so that the enhancement of formability was insufficient. In No. 68, the ratio of the area in which the attached amount of P is equal to or greater than 20 mg/m² was higher than the range of the embodiment, so that the reduction in adhesion was observed. Products according to the embodiment other than those numbers could enhance formability without declining adhesion.

TABLE 4

| No. | Fe % in Galvannealed Layer | Al % in Galvannealed Layer | X-ray Diffraction Intensity in Galvannealed Layer | | | Treatment Liquid Concentration | | | Composite Oxide of Mn, Zn, and P | |
|---|---|---|---|---|---|---|---|---|---|---|
| | | | $I\eta/ISi$ | $I\xi/ISi$ | $I\Gamma/ISi$ | $KMnO_4$ (g/l) | $H_3PO_4$ (g/l) | $H_2PO_3$ (g/l) | P Content (mg/m²) | Mn Content (mg/m²) |
| 61 | 10.6 | 0.25 | 0 | 0.015 | 0.0005 | 14 | 6 | — | 35 | 18 |
| 62 | 10.6 | 0.25 | 0 | 0.015 | 0.0005 | 12 | — | 6 | 26 | 17 |
| 63 | 10.6 | 0.25 | 0 | 0.015 | 0.0005 | 10 | — | 10 | 1.1 | 1 |
| 64 | 10.6 | 0.25 | 0 | 0.015 | 0.0005 | 10 | — | 10 | 17 | 15 |
| 65 | 10.6 | 0.25 | 0 | 0.015 | 0.0005 | 12 | — | 6 | 25 | 19 |
| 66 | 10.6 | 0.25 | 0 | 0.015 | 0.0005 | 12 | — | 6 | 32 | 26 |
| 67 | 10.6 | 0.25 | 0 | 0.015 | 0.0005 | 12 | — | 6 | 35 | 29 |
| 68 | 10.6 | 0.25 | 0 | 0.015 | 0.0005 | 12 | — | 6 | 42 | 24 |

| No. | Composite Oxide of Mn, Zn, and P | | | Area Ratio (%) of equal to or higher than 20 mg/m² | Area Ratio (%) of P/Mn ≥ 3 | Formability | Adhesive Epoxy Based | Adhesive PVC Based | Note |
|---|---|---|---|---|---|---|---|---|---|
| | P/Mn | Kind of P Compound | Aqueous P Compound (%) | | | | | | |
| 61 | 1.94 | $PO_4^{3-}$ | 45 | 67 | 28 | A | A | B | Example of Invention |
| 62 | 1.53 | $PO_3^{2-}$, $PO^{2-}$ | 31 | 43 | 9 | A | A | B | Example of Invention |
| 63 | 1.10 | $PO_3^{2-}$, $PO^{2-}$ | 0 | 0 | 0 | D | A | A | Comparative Example |
| 64 | 1.13 | $PO_3^{2-}$, $PO^{2-}$ | 9 | 21 | 0 | B | A | A | Example of Invention |
| 65 | 1.32 | $PO_3^{2-}$, $PO^{2-}$ | 21 | 38 | 5 | A | A | B | Example of Invention |
| 66 | 1.23 | $PO_3^{2-}$, $PO^{2-}$ | 15 | 64 | 7 | A | A | B | Example of Invention |
| 67 | 1.21 | $PO_3^{2-}$, $PO^{2-}$ | 14 | 79 | 8 | A | A | C | Example of Invention |

TABLE 4-continued

| 68 | 1.75 | $PO_3^{2-}$, $PO^{2-}$ | 39 | 92 | 31 | A | C | D | Comparative Example |

Example 3

A slab having a composition of Symbol D of Table 1 was heated to 1150° C. and subjected to hot rolling at a finishing temperature of 910 to 930° C. to produce a hot-rolled steel strip of 4 mm, and the hot-rolled steel strip was wound up at 680 to 720° C. After performing acid washing on the hot-rolled steel strip, cold rolling was performed thereon to produce a cold-rolled steel strip of 0.8 mm. Thereafter, using a continuous hot dip galvanizing equipment in an in-line annealing system, a galvannealed steel sheet was produced. During the galvannealing, an annealing atmosphere was a mixed gas of 5 vol % of hydrogen and 95 vol % of nitrogen, the annealing temperature was 800 to 840° C., and the annealing time was 90 seconds. As a hot dip galvanizing bath, a hot dip galvanizing bath having an effective Al concentration of 0.105% was used, and a attached amount of zinc was adjusted to 50 g/m² using a gas wiper. During heating in alloying, heating equipment in an induction heating system was used to perform the alloying at 440 to 550° C.

The produced galvannealed steel sheet was cut into a plurality of cut sheets, and treatment solutions in which the concentration of potassium permanganate and the concentration of phosphoric acid were different were applied to the cut sheets to react with the galvannealed surface, thereby producing each test sample. The roll coater was used to apply the treatment liquids, and a distribution of the attached amount of P was changed by changing the interval of the roll coater.

Fe % and Al % in the galvannealed steel sheet, the P concentration and the Mn concentration in the composite oxide layer of Mn, Zn, and P, and the thickness of the composite oxide layer of Mn, Zn, and P were measured as in Example 1.

The kinds of the P compound in the composite oxide layer of Mn, Zn, and P were measured as in Example 2.

Iη/ISi, Iξ/ISi, and IΓ/ISi were measured as in Example 1.

The content of the aqueous P compound, the distribution of the attached amount of P, and the distribution of P/Mn were also measured as in Example 1.

Deep drawability and adhesion were evaluated under the same condition as in Example 1.

The results are shown in Table 5. In No. 76, Fe % in the galvannealed layer and Iξ/ISi were not in the ranges of this embodiment, causing an evaluation of flaking resistance as Fail. In addition, in No. 79, Fe % in the galvannealed layer and IΓ/ISi were not in the ranges of the embodiment, causing an evaluation of powdering resistance as Fail. Products according to the embodiment other than those numbers could enhance the formability without declining adhesion.

TABLE 5

| No. | Fe % in Galvannealed Layer | Al % in Galvannealed Layer | X-ray Diffraction Intensity in Galvannealed Layer | | | Composite Oxide of Mn, Zn, and P | | | | Aqueous P Compound (%) |
|---|---|---|---|---|---|---|---|---|---|---|
| | | | Iη/ISi | Iξ/ISi | IΓ/ISi | P Content (mg/m²) | Mn Content (mg/m²) | P/Mn | Kind of P Compound | |
| 71 | 10.4 | 0.25 | 0 | 0.0015 | 0.0005 | 25 | 19 | 1.32 | $PO_4^{3-}$ | 22 |
| 72 | 10.4 | 0.25 | 0 | 0.0015 | 0.0005 | 25 | 19 | 1.32 | $PO_4^{3-}$ | 22 |
| 73 | 10.4 | 0.25 | 0 | 0.0015 | 0.0005 | 25 | 19 | 1.32 | $PO_4^{3-}$ | 22 |
| 74 | 10.4 | 0.25 | 0 | 0.0015 | 0.0005 | 25 | 19 | 1.32 | $PO_4^{3-}$ | 22 |
| 75 | 10.4 | 0.25 | 0 | 0.0015 | 0.0005 | 25 | 19 | 1.32 | $PO_4^{3-}$ | 22 |
| 76 | 7.6 | 0.23 | 0.001 | 0.014 | 0 | 25 | 19 | 1.32 | $PO_4^{3-}$ | 22 |
| 77 | 9.5 | 0.24 | 0 | 0.0025 | 0.0004 | 25 | 19 | 1.32 | $PO_4^{3-}$ | 22 |
| 78 | 11.1 | 0.25 | 0 | 0.001 | 0.0014 | 25 | 19 | 1.32 | $PO_4^{3-}$ | 22 |
| 79 | 19 | 0.25 | 0 | 0 | 0.015 | 25 | 19 | 1.32 | $PO_4^{3-}$ | 22 |

| No. | Area Ratio (%) of equal to or higher than 20 mg/m² | Area Ratio (%) of P/Mn ≥ 3 | Formability | Adhesive Epoxy Based | Adhesive PVC Based | Adhesion Flaking Resistance | Adhesion Powdering Resistance | Note |
|---|---|---|---|---|---|---|---|---|
| 71 | 39 | 6 | A | A | B | Pass | Pass | Example of Invention |
| 72 | 39 | 6 | A | A | B | " | " | Example of Invention |
| 73 | 39 | 6 | A | A | B | " | " | Example of Invention |
| 74 | 39 | 6 | A | A | B | " | " | Example of Invention |
| 75 | 39 | 6 | A | A | B | " | " | Example of Invention |
| 76 | 39 | 6 | A | A | B | Fail | " | Comparative Example |

TABLE 5-continued

| | | | | | | | | |
|---|---|---|---|---|---|---|---|---|
| 77 | 39 | 6 | A | A | B | Fail | " | Example of Invention |
| 78 | 39 | 6 | A | A | B | " | " | Example of Invention |
| 79 | 39 | 6 | A | A | B | " | Fail | Comparative Example |

Example 4

A slab having a composition of Table 6 was heated to 1150° C. and subjected to hot rolling at a finishing temperature of 910 to 930° C. to produce a hot-rolled steel strip of 4 mm, and the hot-rolled steel strip was wound up at 500 to 600° C. After performing acid washing on the hot-rolled steel strip, cold rolling was performed thereon to produce a cold-rolled steel strip of 0.8 mm. Thereafter, using a continuous hot dip galvanizing equipment in an in-line annealing system, a galvannealed steel sheet was produced. During the galvannealing, an annealing atmosphere was a mixed gas of 5 vol % of hydrogen and 95 vol % of nitrogen, the annealing temperature was 800 to 840° C., and the annealing time was 90 seconds. As a hot dip galvanizing bath, a hot dip galvanizing bath having an effective Al concentration of 0.103% in the bath was used, and a attached amount of zinc was adjusted to 50 g/m² using a gas wiper. During heating in alloying, heating equipment in an induction heating system was used to perform the alloying at 440 to 550° C.

The produced galvannealed steel sheet was cut into a plurality of cut sheets, and treatment solutions in which the concentration of potassium permanganate and the concentration of phosphoric acid were varied were applied to react with the galvannealed surface, thereby producing test samples. The roll coater was used to apply the treatment liquids, and a distribution of the attached amount of P was changed by changing the interval of the grooves of the roll coater.

Fe % and Al % in the galvannealed steel sheet, a P concentration, and an Mn concentration in the composite oxide layer of Mn, Zn, and P, and the thickness of the composite oxide layer of Mn, Zn, and P were measured as in Example 1.

Kinds of the P compound in the composite oxide layer of Mn, Zn, and P were measured as in Example 1.

$I\eta/ISi$, $I\zeta/ISi$, and $I\Gamma/ISi$ were measured as in Example 1.

The content of the aqueous P compound, the distribution of the attached amount of P, and the distribution of P/Mn were also measured as in Example 1.

Deep drawability and adhesion were evaluated under the same condition as in Example 1.

The results are shown in Table 7. In Nos. 81, 87, 93, and 99, the ratios of the area in which the attached amount of P is equal to or greater than 20 mg/m² were lower than the range of the embodiment, so that the enhancement of formability was insufficient.

In Nos. 86, 92, and 98, the ratio of the area in which the attached amount of P is equal to or greater than 20 mg/m² was higher than the range of the embodiment, so that the reduction in adhesion was observed. Products according to the embodiment other than the numbers could enhance formability without declining adhesion.

TABLE 6

| | Chemical Composition (mass %) | | | | | | |
|---|---|---|---|---|---|---|---|
| Symbol | C | Si | Mn | P | S | Al | N |
| J | 0.07 | 0.43 | 2.18 | 0.011 | 0.002 | 0.035 | 0.0028 |
| K | 0.07 | 0.71 | 2.08 | 0.004 | 0.002 | 0.031 | 0.0030 |
| L | 0.07 | 1.14 | 1.95 | 0.007 | 0.003 | 0.037 | 0.0027 |
| M | 0.08 | 1.65 | 1.80 | 0.008 | 0.003 | 0.027 | 0.0035 |
| N | 0.18 | 0.94 | 2.77 | 0.018 | 0.004 | 0.037 | 0.0039 |
| O | 0.08 | 1.83 | 2.35 | 0.004 | 0.005 | 0.063 | 0.0030 |

TABLE 7

| No. | Kind of Sheet | Fe % in Galvannealed Layer | Al % in Galvannealed Layer | X-ray Diffraction Intensity in Galvannealed Layer Iη/ISi | X-ray Diffraction Intensity in Galvannealed Layer Iξ/ISi | X-ray Diffraction Intensity in Galvannealed Layer IΓ/ISi | Composite Oxide of Mn, Zn, and P: P Content (mg/m²) | Composite Oxide of Mn, Zn, and P: Mn Content (mg/m²) | Composite Oxide of Mn, Zn, and P: P/Mn | Composite Oxide of Mn, Zn, and P: Kind of P Compound | Composite Oxide of Mn, Zn, and P: Aqueous P Compound (%) | Area Ratio (%) of equal to or higher than 20 mg/m² | Area Ratio (%) of P/Mn ≥ 3 | Formability | Adhesive Epoxy Based | Adhesive PVC Based | Note |
|---|---|---|---|---|---|---|---|---|---|---|---|---|---|---|---|---|---|
| 81 | Steel Sheet J | 10.7 | 0.25 | 0 | 0.0015 | 0.0005 | 20 | 17 | 1.18 | PO₄³⁻ | 12 | 13 | 0 | C | A | B | Comparative Example |
| 82 | " | 10.7 | 0.25 | 0 | 0.0015 | 0.0005 | 21 | 17 | 1.24 | PO₄³⁻ | 16 | 21 | 2 | A | A | B | Example of Invention |
| 83 | " | 10.7 | 0.25 | 0 | 0.0015 | 0.0005 | 26 | 19 | 1.37 | PO₄³⁻ | 24 | 39 | 5 | A | A | B | Example of Invention |
| 84 | " | 10.7 | 0.25 | 0 | 0.0015 | 0.0005 | 29 | 20 | 1.45 | PO₄³⁻ | 26 | 63 | 11 | A | A | B | Example of Invention |
| 85 | " | 10.7 | 0.25 | 0 | 0.0015 | 0.0005 | 35 | 25 | 1.40 | PO₄³⁻ | 32 | 79 | 12 | A | A | C | Example of Invention |
| 86 | " | 10.7 | 0.25 | 0 | 0.0015 | 0.0005 | 44 | 28 | 1.57 | PO₄³⁻ | 33 | 92 | 23 | A | C | D | Comparative Example |
| 87 | Steel Sheet K | 9.5 | 0.25 | 0 | 0.0038 | 0.0004 | 19 | 16 | 1.19 | PO₄³⁻ | 16 | 9 | 0 | C | A | B | Comparative Example |
| 88 | " | 9.5 | 0.25 | 0 | 0.0038 | 0.0004 | 20 | 18 | 1.11 | PO₄³⁻ | 7 | 23 | 0 | B | A | B | Example of Invention |
| 89 | " | 9.5 | 0.25 | 0 | 0.0038 | 0.0004 | 27 | 22 | 1.23 | PO₄³⁻ | 16 | 44 | 2 | A | A | B | Example of Invention |
| 90 | Steel Sheet L | 11.6 | 0.24 | 0 | 0.0008 | 0.0016 | 31 | 21 | 1.48 | PO₄³⁻ | 29 | 62 | 12 | A | A | B | Example of Invention |
| 91 | " | 11.6 | 0.24 | 0 | 0.0008 | 0.0016 | 34 | 26 | 1.31 | PO₄³⁻ | 20 | 78 | 9 | A | A | C | Example of Invention |

TABLE 7-continued

| No. | Kind of Sheet | Fe % in Galvannealed Layer | Al % in Galvannealed Layer | X-ray Diffraction Intensity in Galvannealed Layer Iη/ISi | X-ray Diffraction Intensity in Galvannealed Layer Iξ/ISi | X-ray Diffraction Intensity in Galvannealed Layer IΓ/ISi | Composite Oxide P Content (mg/m²) | Composite Oxide Mn Content (mg/m²) | P/Mn | Kind of P Compound | Aqueous P Compound (%) | Area Ratio (%) of equal to or higher than 20 mg/m² | Area Ratio (%) of P/Mn ≥ 3 | Form-ability | Adhesive Epoxy Based | Adhesive PVC Based | Note |
|---|---|---|---|---|---|---|---|---|---|---|---|---|---|---|---|---|---|
| 92 | " | 11.6 | 0.24 | 0 | 0.0008 | 0.0016 | 41 | 28 | 1.46 | PO₄³⁻ | 28 | 87 | 17 | A | C | D | Comparative Example |
| 93 | Steel Sheet M | 10.4 | 0.24 | 0 | 0.0019 | 0.0005 | 17 | 14 | 1.21 | PO₄³⁻ | 14 | 6 | 0 | C | A | B | Comparative Example |
| 94 | " | 10.4 | 0.24 | 0 | 0.0019 | 0.0005 | 19 | 15 | 1.27 | PO₄³⁻ | 18 | 22 | 1 | A | A | B | Example of Invention |
| 95 | " | 10.4 | 0.24 | 0 | 0.0019 | 0.0005 | 25 | 18 | 1.39 | PO₄³⁻ | 25 | 38 | 5 | A | A | B | Example of Invention |
| 96 | Steel Sheet N | 11.1 | 0.24 | 0 | 0.0013 | 0.001 | 28 | 19 | 1.47 | PO₄³⁻ | 29 | 60 | 11 | A | A | B | Example of Invention |
| 97 | " | 11.1 | 0.24 | 0 | 0.0013 | 0.001 | 36 | 30 | 1.20 | PO₄³⁻ | 14 | 77 | 5 | A | A | C | Example of Invention |
| 98 | " | 11.1 | 0.24 | 0 | 0.0013 | 0.001 | 45 | 33 | 1.36 | PO₄³⁻ | 24 | 95 | 14 | C | C | D | Comparative Example |
| 99 | Steel Sheet O | 9.9 | 0.24 | 0 | 0.0025 | 0.0004 | 19 | 15 | 1.27 | PO₄³⁻ | 18 | 11 | 0 | A | A | B | Comparative Example |
| 100 | " | 9.9 | 0.24 | 0 | 0.0025 | 0.0004 | 21 | 15 | 1.40 | PO₄³⁻ | 25 | 24 | 2 | A | A | B | Example of Invention |
| 101 | " | 9.9 | 0.24 | 0 | 0.0025 | 0.0004 | 29 | 20 | 1.45 | PO₄³⁻ | 29 | 52 | 8 | A | A | B | Example of Invention |

INDUSTRIAL APPLICABILITY

According to the aspects of the present invention, it is possible to provide a production method of a galvannealed steel sheet which is excellent in both formability and exfoliation resistance after adhesion.

REFERENCE SIGNS LIST 1 steel sheet
2 galvannealed layer
3 flat portion
4 rough portion
5 composite oxide layer
10 galvannealed steel sheet
20 roll coater
21 solution holding part
23 steel contact part
24 recessed portion
30 roll coater
31 solution holding part
33 steel contact part
34 recessed portion

What is claimed is:

1. A production method of a galvannealed steel sheet, the method comprising:
    performing a hot dip galvanization on a steel sheet;
    performing an alloying and forming a galvannealed layer including an amount equal to or more than 0.05% and equal to or less than 0.5% of Al and an amount equal to or more than 6% and equal to or less than 12% of Fe;
    performing a skin pass rolling at an elongation ratio of equal to or more than 0.3%; and
    applying a treatment liquid which includes potassium permanganate and at least one kind of phosphoric acid, phosphorous acid, and hypophosphorous acid on a surface of the galvannealed layer using a roll coater having protrusions and recesses on a surface, and allowing the treatment liquid to react with the surface immediately after the application to form a mixed layer including a composite oxide of Mn, Zn, and P and an aqueous P compound, wherein
    in the forming the mixed layer:
    a first applied part is formed in the mixed layer using the protrusions of the roll coater; and
    a second applied part is formed in the mixed layer using the recesses of the roll coater, the second applied part having an attached amount of P equal to or more than 20 mg/m$^2$, a surface area of the second applied part being equal to or higher than 20% and equal to or lower than 80% of a surface area of the mixed layer.

2. The production method of a galvannealed steel sheet according to claim 1, wherein the total size of the second applied part is adjusted by adjusting a shape of the protrusions and recesses of the roll coater and a nip pressure of the roll coater.

* * * * *

UNITED STATES PATENT AND TRADEMARK OFFICE
CERTIFICATE OF CORRECTION

PATENT NO. : 9,903,022 B2
APPLICATION NO. : 14/685943
DATED : February 27, 2018
INVENTOR(S) : Kazuhiko Honda et al.

It is certified that error appears in the above-identified patent and that said Letters Patent is hereby corrected as shown below:

On the Title Page

Please correct item (73) from:
"Assignee: NIPPON STEEL 7 SUMITOMO METAL CORPORATION, Tokyo (JP)"
To:
--Assignee: NIPPON STEEL & SUMITOMO METAL CORPORATION, Tokyo (JP)--

Signed and Sealed this
Twenty-fourth Day of July, 2018

Andrei Iancu
*Director of the United States Patent and Trademark Office*